United States Patent
Chun et al.

(10) Patent No.: US 10,606,226 B2
(45) Date of Patent: Mar. 31, 2020

(54) METHOD FOR CONTROLLING AN EXTERNAL DEVICE AND AN ELECTRONIC DEVICE THEREFOR

(71) Applicant: SAMSUNG ELECTRONICS CO., LTD., Suwon-si, Gyeonggi-do (KR)

(72) Inventors: Jae-Woong Chun, Suwon-si (KR); Won-Suk Choi, Seoul (KR); Jung-Eun Lee, Suwon-si (KR); Cheol-Ho Cheong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 287 days.

(21) Appl. No.: 15/159,208

(22) Filed: May 19, 2016

(65) Prior Publication Data

US 2016/0344569 A1 Nov. 24, 2016

(30) Foreign Application Priority Data

May 20, 2015 (KR) ........................ 10-2015-0070486

(51) Int. Cl.
*G05B 19/042* (2006.01)
*G06F 3/0484* (2013.01)
*G06F 3/0481* (2013.01)
*G05B 15/02* (2006.01)

(52) U.S. Cl.
CPC ....... *G05B 19/042* (2013.01); *G06F 3/04817* (2013.01); *G06F 3/04842* (2013.01); *G05B 15/02* (2013.01); *G05B 2219/2614* (2013.01); *G05B 2219/2642* (2013.01)

(58) Field of Classification Search
CPC .................. G05B 19/042; G05B 15/02; G05B 2219/2614; G05B 2219/2642; G06F 3/04817; G06F 3/04842
USPC ....................................................... 700/275
See application file for complete search history.

(56) References Cited

U.S. PATENT DOCUMENTS

| | | | |
|---|---|---|---|
| 2008/0317292 A1 | 12/2008 | Baker et al. | |
| 2012/0079507 A1 | 3/2012 | Agarwal et al. | |
| 2013/0238348 A1 | 9/2013 | Kim | |
| 2014/0176310 A1* | 6/2014 | Kotlicki | G08C 17/02 340/12.5 |
| 2015/0058779 A1* | 2/2015 | Bruck | G05D 23/1904 715/771 |
| 2015/0142141 A1* | 5/2015 | Okabayashi | G08C 17/02 700/83 |
| 2015/0223705 A1* | 8/2015 | Sadhu | G01S 19/17 600/301 |
| 2015/0338117 A1* | 11/2015 | Henneberger | G05B 15/02 700/276 |
| 2016/0047565 A1* | 2/2016 | Robinson | H04L 12/2803 700/278 |
| 2016/0182703 A1* | 6/2016 | Khurana | H04W 4/023 455/420 |

(Continued)

*Primary Examiner* — James J Lee
*Assistant Examiner* — Michael W Choi
(74) *Attorney, Agent, or Firm* — Nixon & Vanderhye P.C.

(57) ABSTRACT

A method for controlling an external device by an electronic device, according to various embodiments of the present disclosure, may include: obtaining biometric information related to a user of the electronic device; generating user information related to the user based on the biometric information; and storing the user information.

10 Claims, 21 Drawing Sheets

(56) References Cited

U.S. PATENT DOCUMENTS

2016/0187995 A1\* 6/2016 Rosewall ................ H04W 4/02
  345/156
2017/0126689 A1\* 5/2017 Lloyd ................. G06F 3/04817

\* cited by examiner

| PARAMETER | | TV | LIVING ROOM LIGHT | WAREHOUSE LIGHT | AIR CONDITIONER | HEATER | REFRIGERATOR | ROBOT VACUUM CLEANER | WASHING MACHINE | HUMIDIFIER | CURTAIN OPENING/CLOSING DEVICE | MICROWAVE OVEN |
|---|---|---|---|---|---|---|---|---|---|---|---|---|
| BIOMETRIC INFORMATION | BLOOD GLUCOSE | X | X | X | X | X | O | X | X | X | X | X |
| | BLOOD PRESSURE | O | O | X | O | O | O | O | O | O | O | O |
| | FLU | X | X | X | O | O | X | X | X | O | O | X |
| | BODY TEMPERATURE | X | X | X | O | O | X | X | X | X | X | X |
| | RESPIRATION | X | X | X | O | O | X | X | X | O | O | X |
| | SKIN MOISTURE | X | X | X | O | O | X | X | X | O | X | X |
| | HEART RATE | O | O | X | O | O | O | O | O | O | O | O |
| | BODY FAT | X | X | X | X | X | O | X | X | X | X | X |
| | DEGREE OF FATIGUE | O | O | X | O | O | O | O | O | O | O | O |
| | AMOUNT OF SLEEP | O | O | X | O | O | O | O | O | O | O | O |
| | WEIGHT | X | X | X | X | X | O | X | X | X | X | X |
| | FINGERPRINT/IRIS | X | X | X | X | X | X | X | X | X | X | X |
| FEELING INFORMATION | PLEASURE | O | O | X | X | X | O | X | X | X | O | X |
| | SORROW | O | O | X | X | X | O | X | X | X | O | X |
| | ANGER | O | O | X | X | X | X | X | X | X | O | X |
| | HIGH STRESS | O | O | X | X | X | X | X | X | X | X | X |
| | FUN | O | O | X | X | X | X | X | X | X | X | X |
| | DEPRESSION | O | O | X | X | X | X | X | X | X | X | X |
| | SURPRISE | O | O | X | X | X | X | X | X | X | X | X |
| | FEAR | O | O | X | X | X | X | X | X | X | X | X |
| MOTION INFORMATION | EATING | O | O | X | O | O | O | X | X | O | O | O |
| | SLEEPING | O | O | X | O | O | X | O | O | O | O | X |
| | EXERCISING | X | X | X | O | O | X | X | X | O | X | X |
| | WATCHING TV | O | O | X | X | X | X | O | O | X | O | X |
| | CHATTING | O | O | X | O | O | X | O | O | X | X | X |
| | WORKING | O | O | X | O | O | X | O | O | X | O | X |
| | STUDYING | O | O | X | O | O | X | X | X | X | X | X |
| | WASHING BODY | X | X | X | X | X | X | X | X | X | X | X |
| | CLEANING | X | X | X | X | X | X | O | X | X | X | X |

FIG.10

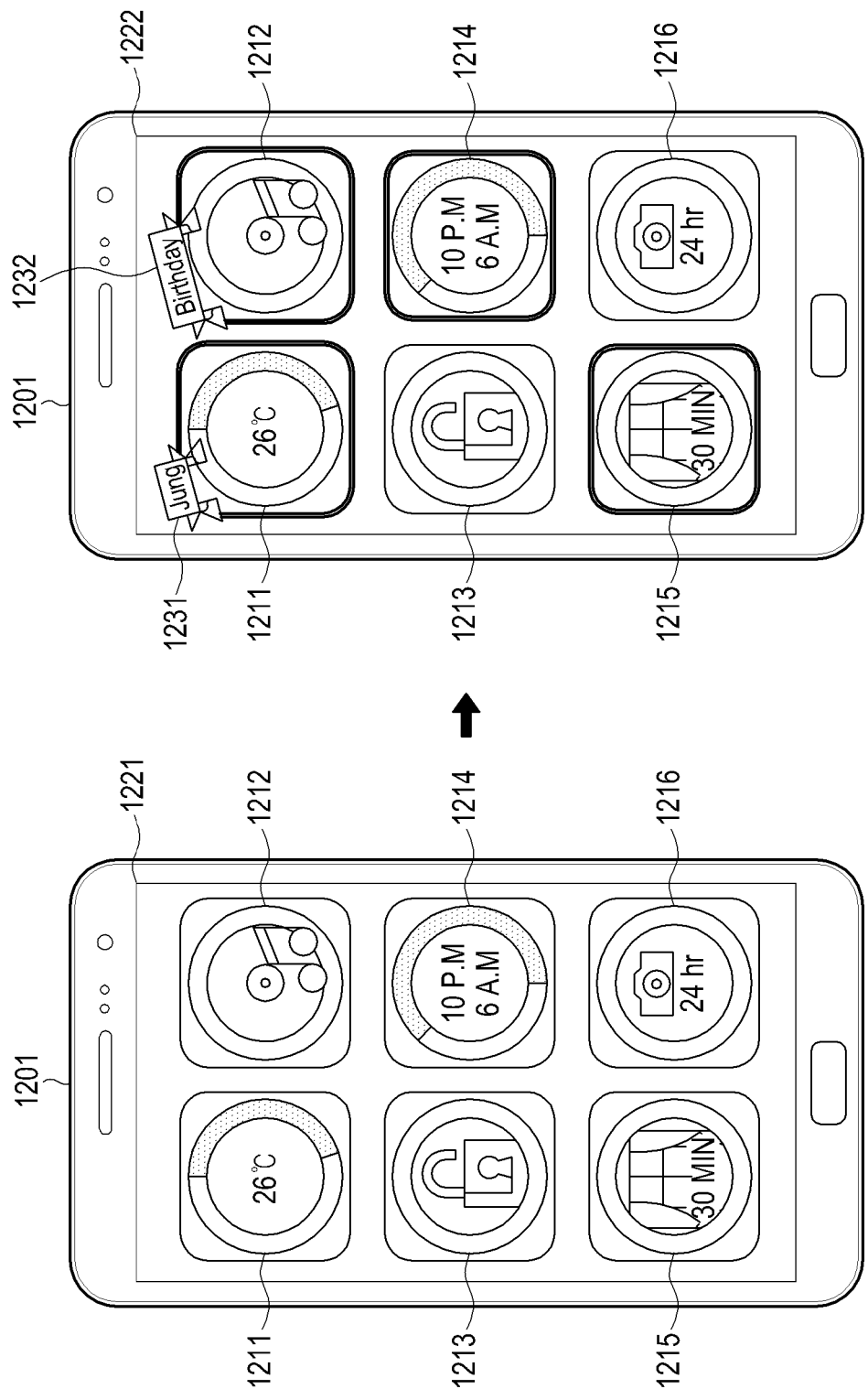

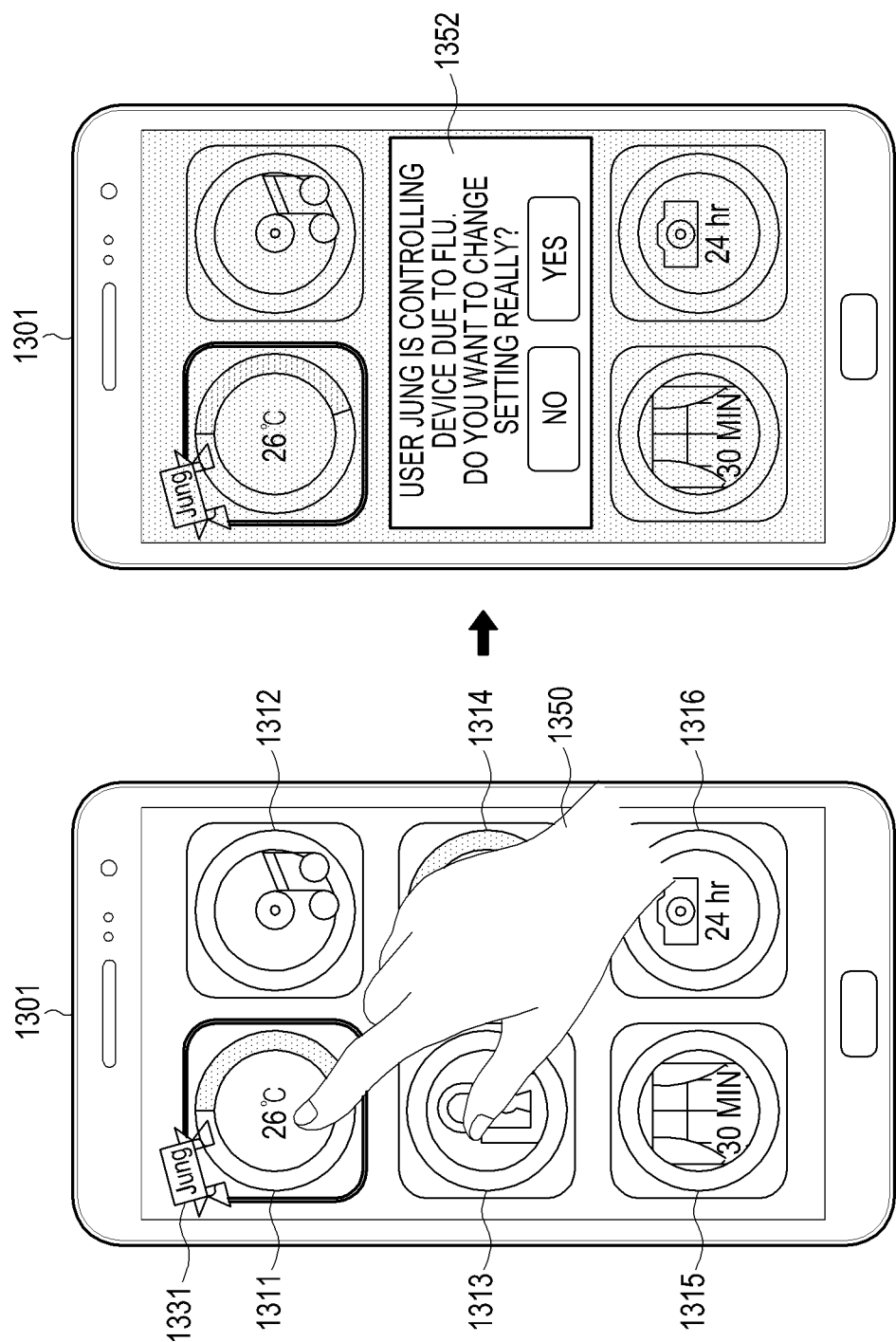

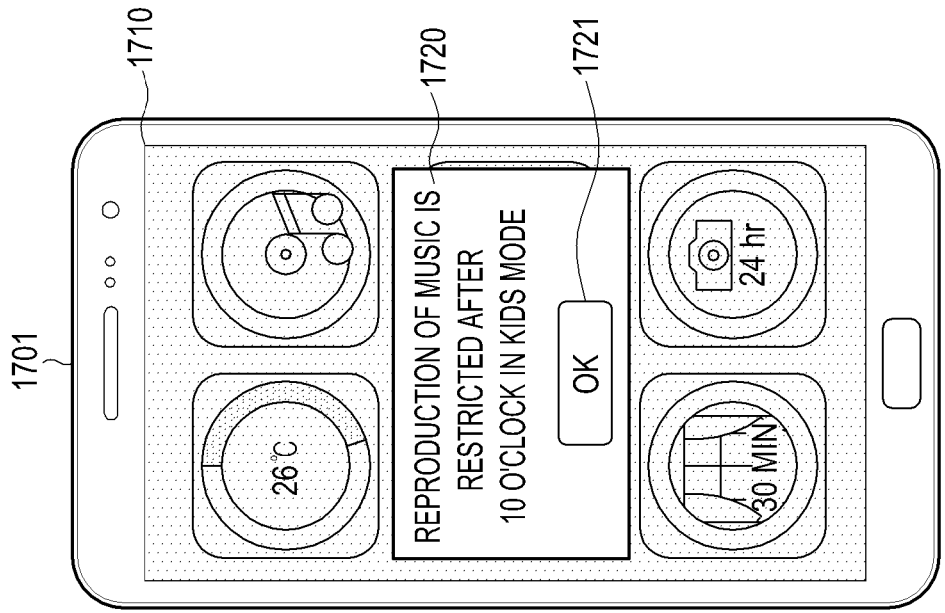
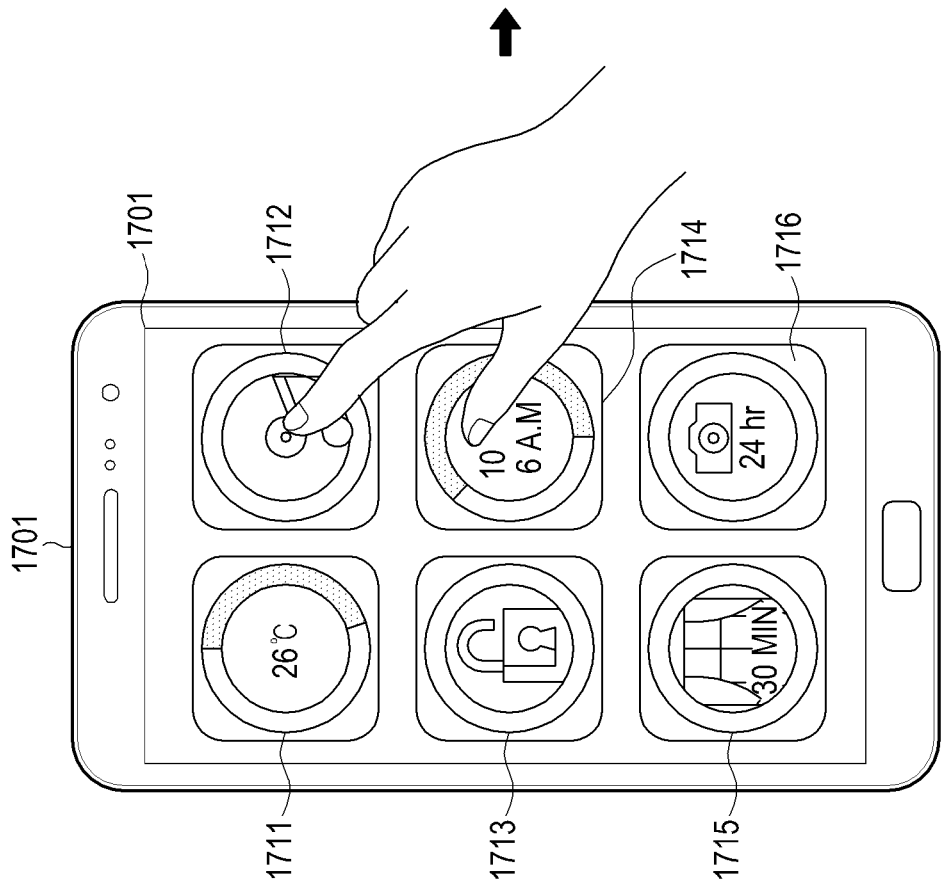
FIG.17A
FIG.17B

| STATE INFORMATION | FLU | EXERCISE | SWEAT | ... |
|---|---|---|---|---|
| NUMBER OF USERS | 4 | 5 | 3 | ... |
| SET TEMPERATURE | 26 | 22 | 24 | ... |

| CHANNEL | 5 | 7 | 9 | 11 | ⋮ |
|---|---|---|---|---|---|
| GENRE | NEWS | ENTERTAINMENT | SPORTS | MOVIE | |
| CORRESPONDING STATE | | DEPRESSION, HIGH-STRESS | DEPRESSION, HIGH-STRESS | BLOOD PRESSURE, HEART RATE | |
| VIEWERS' AGE | ALL | 12+ | ALL | 19+ | ⋮ |
| NUMBER OF VIEWERS | 4 | 5 | 3 | 2 | |
| NOT ADMITTED | | | | 4 | |

FIG.19

METHOD FOR CONTROLLING AN EXTERNAL DEVICE AND AN ELECTRONIC DEVICE THEREFOR

CROSS-REFERENCE TO RELATED APPLICATION

This application is based on and claims priority under 35 U.S.C. § 119 to Korean Application Serial No. 10-2015-0070486, which was filed in the Korean Intellectual Property Office on May 20, 2015, the disclosure of which is incorporated by reference herein in its entirety.

TECHNICAL FIELD

Various embodiments relate to a method for controlling at least one external device by an electronic device and the electronic device.

BACKGROUND

Electronic devices can perform various data communication functions, as well as voice call functions, with the development of mobile communication technologies. The electronic devices (for example, mobile devices) can provide a variety of services through various applications. The electronic devices can provide multimedia services (e.g., music services, video services, or digital broadcasting services) or network based communication services, such as a telephone call service, a wireless Internet service, a Short Message Service (SMS), a Multimedia Messaging Service (MMS), etc. Further, the electronic devices can acquire sensor information through various types of sensor modules mounted thereon. The electronic devices may include sensor modules, for example, an acceleration sensor, a gyro sensor, an RGB sensor, or an illumination sensor.

The operating states of the electronic devices can be controlled through external devices (e.g., set-top boxes) in smart home network environments. Further, electronic devices (e.g., smart phones or portable terminals) can control various devices in Internet of Things (IoT) environments in which the various devices are connected to each other through the Internet.

SUMMARY

Various embodiments of the present disclosure may provide a method for controlling at least one external device by an electronic device based on information exchange between the electronic device (e.g., a portable terminal) and at least one sensor module included therein (e.g., a pulse sensor, an accelerometer, etc.) and an electronic device for the same.

Furthermore, various embodiments of the present disclosure may provide a method in which at least one of a user's physical state and emotional state is shared with another user so that a plurality of users can conveniently control the same external device.

Various embodiments of the present disclosure may provide a method in which information that represents the physical state or emotional state of a user that uses an electronic device is transmitted to an external device controlled by the electronic device so that the external device can execute an operation requested by the electronic device in consideration of a plurality of users' physical states or emotional states, and may provide one or more devices for the same.

A method for controlling an external device by an electronic device, according to various embodiments of the present disclosure, for solving such problems in the related art may include: obtaining biometric information related to a user of the electronic device; generating user information based on the biometric information; and storing the user information.

A method in which an external device operates under the control of an electronic device, according to various embodiments of the present disclosure, may include: receiving, from the electronic device, a request for transmitting device information related to the external device; transmitting the external device information to the electronic device; receiving shared information required for controlling the external device from the electronic device; and receiving, from the electronic device, a first control signal based on the device information or the shared information.

An electronic device for controlling an external device according to various embodiments of the present disclosure, may include: a memory; a sensor module comprising at least one sensor configured to obtain biometric information related to a user of the electronic device; and a processor configured to generate user information based on the biometric information, and to store the user information to the memory.

An external device controlled by an electronic device according to various embodiments of the present disclosure, may include: a communication interface; and a processor configured to: receive, from an electronic device, a request for transmitting device information related to the external device through the communication interface, to transmit the external device information to the electronic device through the communication interface, to receive shared information required for controlling the external device from the electronic device through the communication interface, and to receive a first control signal based on the device information or the shared information from the electronic device through the communication interface.

In a machine readable recording medium with a program recorded therein for executing a method for controlling an external device by an electronic device, according to various embodiments of the present disclosure, the method may include: obtaining biometric information related to a user of the electronic device; generating user information based on the biometric information; and storing the user information.

As described above, the various embodiments of the present disclosure provide a method for controlling at least one external device and an electronic device for the same, in which information that represents the physical state or emotional state of a user that uses the electronic device is transmitted to the external device controlled by the electronic device so that the external device can execute an operation requested by the electronic device in consideration of a plurality of users' physical states or emotional states.

When various type of sensor modules (e.g., an angular velocity sensor, an accelerometer, a barometer, an ECG sensor, an HRM sensor, or a PPG sensor) that are capable of measuring a user's state are mounted in an electronic device, the electronic device may analyze the user's action, physical state, or emotional state. Furthermore, based on the analysis result, the electronic device may control (e.g., turn on or off) devices (e.g., a computer, a washing machine, a refrigerator, a television, or a lamp) that are connected with each other (e.g., smart home and IoT environments).

In the control of devices that may be installed in various places (e.g., a house, an office, or a public place), the electronic device may control the devices by receiving instructions (e.g., control signals) from a plurality of users. In this case, the instructions received from the users or the requested services (e.g., control purposes) may differ from each other so that the electronic device may have difficulty in controlling the devices. For example, due to the plurality of instructions or service requests, the user settings of the devices may change, or the devices may operate differently from the requested instructions.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein:

FIG. 10 is a table that lists information that an electronic device shares with external devices, according to various embodiments of the present disclosure;

FIGS. 12A and 12B are views illustrating an example of an electronic device that controls one or more external devices, according to various embodiments of the present disclosure;

FIGS. 13A and 13B are views illustrating another example of an electronic device that controls one or more external devices, according to various embodiments of the present disclosure;

FIGS. 17A and 17B are views illustrating yet another example of an electronic device that controls one or more external devices, according to various embodiments of the present disclosure; and FIGS. 18 and 19 illustrate examples of controlling an external device according to the states of users that use a plurality of electronic devices, respectively.

DETAILED DESCRIPTION

Figure 1:
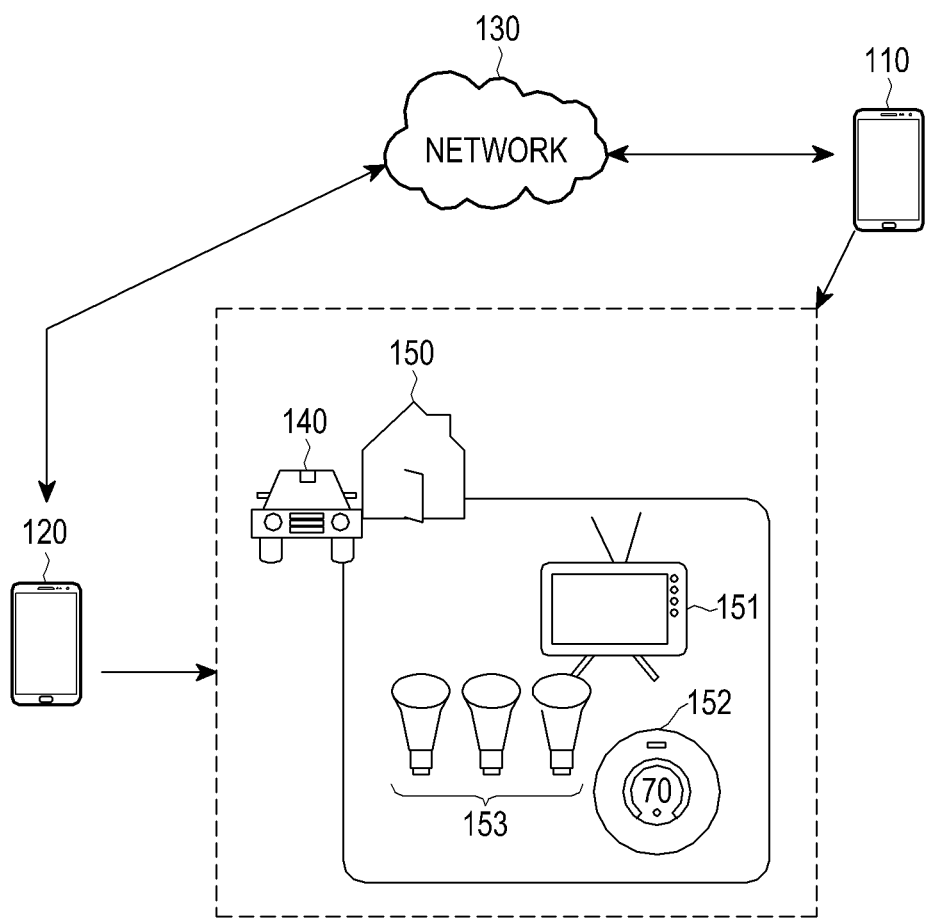
FIG. 1 is a diagram illustrating a network environment that includes a plurality of electronic devices, according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). Conversely, when one component element is "directly coupled" or "directly connected" to another component element, it may be construed that a third component element does not exist between the first component element and the second component element.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasound machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating a network environment that includes a plurality of electronic devices, according to various embodiments of the present disclosure.

Referring to FIG. 1, electronic devices 110 and 120 that users use, respectively, may control external devices (e.g., a vehicle 140 or home devices 151, 152, and 153 in a house 150) that are connected thereto through wired or wireless networks. According to an embodiment, the external devices may refer to all devices that exist outside the electronic device 110 and 120 and can be controlled by the electronic devices 110 and 120.

According to an embodiment, each of the electronic devices 110 and 120 may share information related to the corresponding user's emotions or health with the other electronic device. For example, user A may transmit information related to his/her emotions or health to the second electronic device 120 of user B by using the first electronic device 110. In this case, the information related to user A's emotions or health may be transferred to the second electronic device 120 of user B through a network 130. When the second electronic device 120 receives the information related to user A's emotions or health through the network 162, the second electronic device 120 may control the external devices (e.g., the vehicle 140 or the home devices 151 to 153 in the house 150) based on the information related to user A's emotions or health and information related to user B's emotions or health.

For example, user B may transmit information related to his/her emotions or health to the first electronic device 110 of user A by using the second electronic device 120. When the first electronic device 110 receives the information related to user B's emotions or health, the first electronic device 110 may control the external devices (e.g., the vehicle 140 or the home devices 151 to 153 in the house 150) based on the information related to user B's emotions or health and information related to user A's emotions or health.

According to an embodiment, the electronic devices 110 and 120 may transmit, to the external devices (e.g., the vehicle 140 or the home devices 151 to 153 in the house 150), information related to the emotions or health of the users that use the electronic devices 110 and 120, respectively. Furthermore, each of the external devices (e.g., the vehicle 140 or the home devices 151 to 153 in the house 150) may store the information related to each user's emotions or health and may operate based on the information related to each user's emotions or health.

Figure 2:
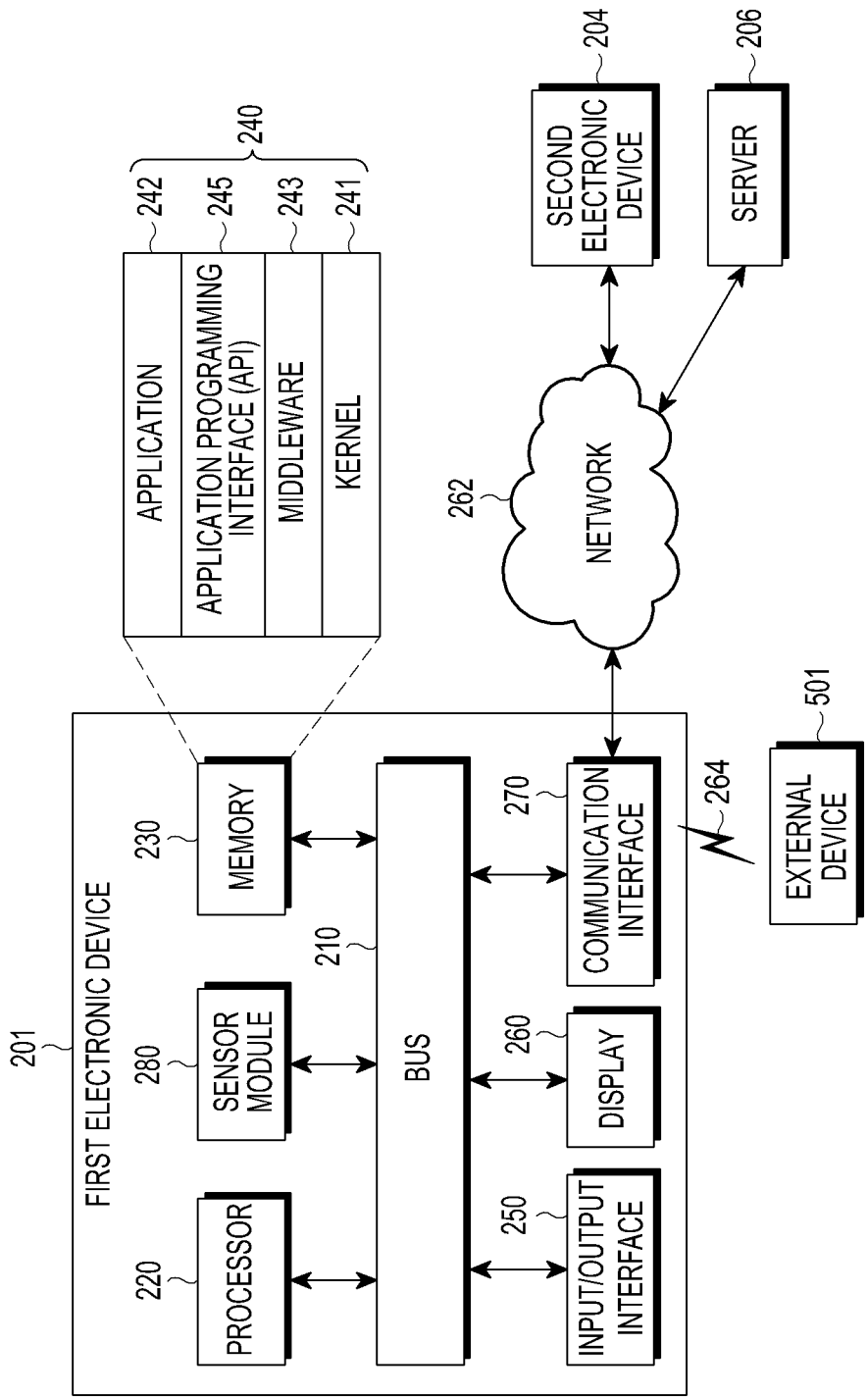
FIG. 2 is a diagram illustrating a network environment system that includes an electronic device, according to various embodiments of the present disclosure.

FIG. 2 is a diagram illustrating a network environment system that includes a first electronic device 201, according to various embodiments of the present disclosure. The first electronic device 201 within the network environment, according to the various embodiments, will be described with reference to FIG. 2.

The first electronic device 201 may include a bus 210, a processor 220, a memory 230, an input/output interface 250, a display 260, a communication interface 270, or a sensor module 280. In some embodiments, the first electronic device 201 may omit at least one of the elements, or may further include other elements.

According to an embodiment, the bus 210 may include, for example, a circuit that connects the elements 220 to 280 with each other and transfers communication (e.g., control messages and/or data) between the elements.

According to an embodiment, the processor 220 may include one or more of a Central Processing Unit (CPU), an Application Processor (AP), and a Communication Processor (CP). For example, the processor 220 may carry out operations or data processing related to control and/or communication of at least one other element of the first electronic device 201.

According to an embodiment, the processor 220 may determine the action, physical state, or emotional state of a user that uses the first electronic device 201 based on sensing data measured by the sensor module 280. The processor 220 may generate user information for representing the user's action, physical state, or emotional state. Furthermore, the processor 220 may control the communication interface 270 to transmit at least part of the user information to external devices (e.g., an external device 501, a second electronic device 204, or a server 206) that are connected to the first electronic device 201.

According to an embodiment, the memory 230 may include a volatile memory and/or non-volatile memory. The memory 230 may store, for example, instructions or data related to at least one other element of the first electronic device 201. According to an embodiment, the memory 230 may store software and/or a program 240. The program 240 may include, for example, a kernel 241, middleware 243, an Application Programming Interface (API) 245, and/or application programs (or "applications") 247. At least some of the kernel 241, the middleware 243, and the API 245 may be referred to as an Operating System (OS).

According to another embodiment, the memory 230 may store user information generated by the processor 220 or user information on another user, other than the user that uses the first electronic device 201, which is received from the external device 501 or the second electronic device 204.

According to an embodiment, the kernel 241 may control or manage, for example, the system resources (e.g., the bus 210, the processor 220, the memory 230, etc.) that are used to execute operations or functions implemented in the other programs (e.g., the middleware 243, the API 245, and the application programs 247). Furthermore, the kernel 241 may provide an interface through which the middleware 243, the API 245, or the application programs 247 may access the individual elements of the first electronic device 201 to control or manage the system resources.

According to an embodiment, the middleware 243 may, for example, function as an intermediary for allowing the API 245 or the application programs 247 to communicate with the kernel 241 to exchange data. Furthermore, the middleware 243 may process one or more task requests received from the application programs 247 according to the priorities thereof. For example, the middleware 243 may assign priorities for using the system resources (e.g., the bus 210, the processor 220, the memory 230, etc.) of the first electronic device 201 to one or more of the application programs 247. For example, the middleware 243 may perform scheduling or load balancing on the one or more task requests by processing the one or more task requests according to the priorities assigned to the one or more application programs.

According to an embodiment, the API 245 is an interface through which the applications 247 control functions provided from the kernel 241 or the middleware 243, and may include, for example, at least one interface or function (e.g., instruction) for file control, window control, image processing, text control, etc.

According to an embodiment, the input/output interface 250 may function as, for example, an interface that forwards instructions or data, which is input from the user or the external devices, to the other element(s) of the first electronic device 201. In addition, the input/output interface 250 may output instructions or data received from the other element(s) of the first electronic device 201 to the user or the external devices.

According to an embodiment, the input/output interface 250 may receive: a user input for controlling the first electronic device 201; information related to the user's action, physical state, or emotional state (namely, information for generating user information); or a user input for controlling the external device 501 from the user.

According to an embodiment, the display 260 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 260 may display, for example, various types of content (e.g., text, images, videos, icons, symbols, etc.) for the user. The display 260 may include a touch screen and may receive, for example, a touch input, a gesture input, a proximity input, or a hovering input using an electronic pen or a part of the user's body.

According to an embodiment, the display 260 may display user information for representing the action, physical state, or emotional state of the user that uses the first electronic device 201. Furthermore, the display 260 may also display user information of a user that uses the external device 501 or user information of a user that uses the second electronic device 204. The display 260 may also display the current state or control state of the external device 501.

According to an embodiment, the communication interface 270 may set, for example, communication between the first electronic device 201 and the external devices (e.g., the second electronic device 204, the external device 501, or the server 206). For example, the communication interface 270 may be connected to a network 262 through wireless or wired communication to communicate with the external devices (e.g., the second electronic device 204, the external device 501, or the server 206). According to an embodiment, the communication interface 270 may receive, through the network 262, at least part of the user information on the user that uses the second electronic device 204.

According to an embodiment, the wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 264. The short range communication 264 may include, for example, at least one of WiFi, Bluetooth, Near Field Communication (NFC), Global Navigation Satellite System (GNSS), etc. The GNSS may include, for example, at least one of a Global Positioning System (GPS), a Global navigation satellite system (Glonass), a Beidou navigation satellite system (hereinafter, referred to as "Beidou"), and Galileo (European global satellite-based navigation system) according to the place of usage or the bandwidth thereof. Hereinafter, the term "GPS" may be interchangeably used with the term "GNSS" in the present disclosure. The wired communication may include, for example, at least one of a Universal Serial Bus (USB), a High Definition Multimedia Interface (HDMI), Recommended Standard 232 (RS-232), a Plain Old Telephone Service (POTS), etc. The network 262 may include a telecommunication network, for example, at least one of a computer network (e.g., a LAN or a WAN), the Internet, and a telephone network.

According to an embodiment, the sensor module 280 may, for example, measure a physical quantity or detect the operating state of the first electronic device 201 and may convert the measured or detected information into an electric signal. The sensor module 280 may include, for example, at least one of a gesture sensor, a gyro sensor, an atmospheric pressure sensor, a magnetic sensor, an acceleration sensor, a grip sensor, a proximity sensor, a color sensor (e.g., a Red, Green, and Blue (RGB) sensor), a biometric sensor, a temperature/humidity sensor, an illumination sensor, and an Ultraviolet (UV) sensor. Additionally or alternatively, the sensor module may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 280 may further include a control circuit for controlling one or more sensors included therein. In some embodiments, the first electronic device 201 may further include a processor configured to control the sensor module 280 as a part of, or separately from, the processor 220, and may control the sensor module 280 while the processor 220 is in a sleep state.

According to an embodiment, the sensor module 280 may include a biometric sensor, such as a pedometer, a blood pressure meter, a blood glucose meter, a PPG, an ECG, an EMG, an EEG, an oxygen saturation measurement sensor, a skin moisture measurement sensor, a body fat analyzer, a body temperature sensor, etc., to measure the user's physical or emotional state. Furthermore, the sensor module 280 may include a fingerprint sensor, an iris recognition sensor, a face recognizer, a hand geometry recognizer, a hand vascular pattern recognizer, a voice recognizer, a handwritten signature recognizer, etc. to recognize the user's biometric features. In addition, the sensor module 280 may further include a camera module, an IR camera module, a touch sensor, a microphone, etc. to recognize the user's biometric features.

According to an embodiment, the second electronic device 204 and the external device 501 may be the same or a different type of device from the first electronic device 201.

The external device 501 may be a device (e.g., the vehicle 140 or the home device 150) that is controlled by the first electronic device 201. According to an embodiment, the server 206 may include a group of one or more servers.

According to various embodiments, all or some of the operations executed in the first electronic device 201 may be executed in another electronic device or a plurality of electronic devices (e.g., the second electronic device 204, the external device 501, or the server 206). According to an embodiment, when the first electronic device 201 has to perform a certain function or service automatically or in response to a request, the first electronic device 201 may request another device (e.g., the second electronic device 204, the external device 501, or the server 206) to perform at least some functions related thereto, instead of, or in addition to, performing the function or service by itself. The other electronic device (e.g., the second electronic device 204, the external device 501, or the server 206) may execute the requested function or the additional functions and may transfer the result to the first electronic device 201. The first electronic device 201 may process the received result as it is or additionally to provide the requested function or service. To achieve this, for example, cloud computing, distributed computing, or client-server computing technology may be used.

An electronic device for controlling an external device according to various embodiments of the present disclosure, may include: a memory; a sensor module configured to obtain biometric information related to a user of the electronic device; and a processor configured to generate user information related to the user based on the biometric information, and store the user information to the memory.

Figure 3:
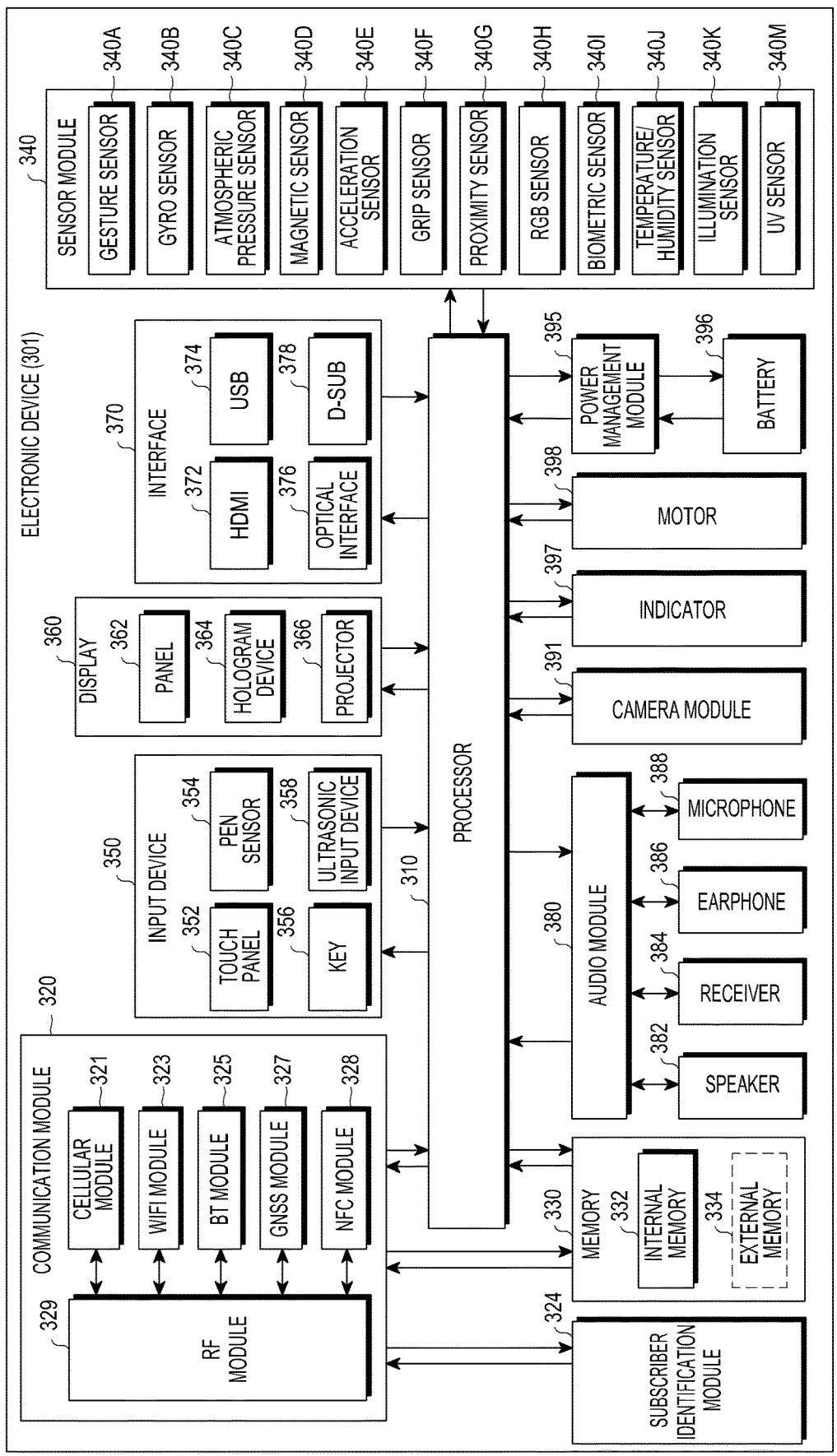
FIG. 3 is a block diagram of an electronic device according to various embodiments of the present disclosure.

FIG. 3 is a block diagram of an electronic device 301 according to various embodiments of the present disclosure.

The electronic device 301 may include, for example, the entirety or a part of the first electronic device 201 illustrated in FIG. 2. The electronic device 301 may include at least one processor (e.g., an Application Processor (AP) e.g., including processing circuitry) 310, a communication module (e.g., including communication circuitry) 320, a subscriber identification module 324, a memory 330, a sensor module (e.g., including one more sensors) 340, an input device (e.g., including input circuitry) 350, a display (e.g., including a display panel) 360, an interface (e.g., including interface circuitry) 370, an audio module 380, a camera module 391, a power management module 395, a battery 396, an indicator 397, and a motor 398.

According to an embodiment, the processor 310 may drive an operating system or an application program to control a plurality of hardware or software elements connected thereto and to perform various types of data processing and operations. The processor 310 may be embodied as, for example, a System on Chip (SoC). According to an embodiment, the processor 310 may further include a Graphic Processing Unit (GPU) and/or an image signal processor. The processor 310 may also include at least some (e.g., a cellular module 321) of the elements illustrated in FIG. 3. The processor 310 may load instructions or data received from at least one (e.g., a non-volatile memory) of the other elements into a volatile memory, process the loaded instructions or data, and store various data in a non-volatile memory.

According to an embodiment, the communication module 320 may have a configuration that is the same as, or similar to, that of the communication interface 270 of FIG. 2. The communication module 320 may include, for example, a cellular module 321, a WiFi module 323, a Bluetooth module 325, a GNSS module 327 (e.g., a GPS module, a Glonass module, a Beidou module, or a Galileo module), an NFC module 228, and a Radio Frequency (RF) module 229.

According to an embodiment, the cellular module 321 may provide, for example, a voice call, a video call, a text message service, an Internet service, etc. through a communication network. According to an embodiment, the cellular module 321 may identify and authenticate the electronic device 301 within a communication network using the subscriber identification module 324 (e.g., a SIM card). According to an embodiment, the cellular module 321 may perform at least some of the functions that the processor 310 may provide. According to an embodiment, the cellular module 321 may include a Communication Processor (CP).

According to an embodiment, the WiFi module 323, the Bluetooth module 325, the GNSS module 327, or the NFC module 328 may include, for example, a processor for processing data that is transmitted and received through the corresponding module. According to some embodiments, at least some (e.g., two or more) of the cellular module 321, the WiFi module 323, the Bluetooth module 325, the GNSS module 327, and the NFC module 328 may be included in one Integrated Chip (IC) or IC package.

According to an embodiment, the RF module 329 may transmit/receive, for example, a communication signal (e.g., an RF signal). The RF module 329 may include, for example, a transceiver, a Power Amp Module (PAM), a frequency filter, a Low Noise Amplifier (LNA), or an antenna. According to another embodiment, at least one of the cellular module 321, the WiFi module 323, the Bluetooth module 325, the GNSS module 327, and the NFC module 328 may transmit and receive an RF signal through a separate RF module.

According to an embodiment, the subscriber identification module 324 may include, for example, a card that includes a subscriber identification module and/or an embedded SIM, and may contain unique identification information (e.g., an Integrated Circuit Card Identifier (ICCID)) or subscriber information (e.g., an International Mobile Subscriber Identity (IMSI)).

According to an embodiment, the memory 330 (e.g., the memory 230 of the first electronic device 201) may include, for example, an internal memory 332 or an external memory 334. The internal memory 332 may include, for example, at least one of a volatile memory (e.g., a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), etc.).

According to an embodiment, the external memory 334 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, etc. The external memory 334 may be functionally and/or physically connected to the electronic device 301 through various interfaces.

According to an embodiment, the sensor module 340 may have a configuration that is the same as, or similar to, that of the sensor module 280 of FIG. 2. The sensor module 340 may, for example, measure a physical quantity or detect the operating state of the electronic device 301 and may convert the measured or detected information to an electrical signal. The sensor module 340 may include, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a Red, Green, and Blue (RGB) sensor), a biometric sensor 340I, a temperature/humidity sensor 340J, an illumination sensor 340K, and a ultraviolet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 340 may further include a control circuit for controlling one or more sensors included therein. In some embodiments, the electronic device 301 may further include a processor configured to control the sensor module 340 as a part of, or separately from, the processor 310, and may control the sensor module 340 while the processor 310 is in a sleep state.

According to an embodiment, the input device 350 may include, for example, a touch panel 352, a (digital) pen sensor 254, a key 356, and an ultrasonic input device 358. The touch panel 352 may use, for example, at least one of a capacitive type, a resistive type, an infrared type, and an ultrasonic type. Furthermore, the touch panel 352 may further include a control circuit. The touch panel 352 may further include a tactile layer to provide a tactile reaction to a user.

According to an embodiment, the (digital) pen sensor 354 may include, for example, a recognition sheet that is a part of, or separate from, the touch panel. The key 356 may include, for example, a physical button, an optical key, or a keypad. The ultrasonic input device 358 may detect ultrasonic waves, which are generated by an input tool, through a microphone (e.g., a microphone 388) and may identify data corresponding to the detected ultrasonic waves.

According to an embodiment, the display 360 (e.g., the display 260 of the first electronic device 201) may include a panel 362, a hologram device 364, or a projector 366. The panel 362 may include a configuration that is the same as, or similar to, that of the display 260 of FIG. 2. The panel 362 may be implemented to be, for example, flexible, transparent, or wearable. The panel 362 and the touch panel 352 may be implemented as one module. The hologram device 364 may show a three-dimensional image in the air by using an interference of light. The projector 366 may display an image by projecting light onto a screen. The screen may be located, for example, in the interior of, or on the exterior of, the electronic device 301. According to an embodiment, the display 360 may further include a control circuit for controlling the panel 362, the hologram device 364, or the projector 366.

According to an embodiment, the interface 370 may include, for example, a high-definition multimedia interface (HDMI) 372, a universal serial bus (USB) 374, an optical interface 376, and a D-subminiature (D-sub) 378. The interface 370 may be included, for example, in the communication interface 270 illustrated in FIG. 2. Additionally or alternatively, the interface 370 may include, for example, a Mobile High-definition Link (MHL) interface, a Secure Digital (SD) card/Multi-Media Card (MMC) interface, or an Infrared Data Association (IrDA) standard interface.

According to an embodiment, the audio module 380 may, for example, convert a sound into an electrical signal, and vice versa. At least some elements of the audio module 380 may be included, for example, in the input/output interface 250 illustrated in FIG. 2. The audio module 380 may process sound information that is input or output through, for example, a speaker 382, a receiver 384, earphones 386, the microphone 388, etc.

According to an embodiment, the camera module 391 may capture, for example, a still image or a moving image. According to one embodiment, the camera module 391 may include one or more image sensors (e.g., a front sensor or a rear sensor), a lens, an Image Signal Processor (ISP), or a flash (e.g., an LED or a xenon lamp).

According to an embodiment, the power management module 395 may manage the power of the electronic device 301. According to an embodiment, the power management module 395 may include a Power Management Integrated Circuit (PMIC), a charger Integrated Circuit (IC), or a battery or fuel gauge. The PMIC may have a wired and/or wireless charging scheme. Examples of the wireless charging method may include, for example, a magnetic resonance scheme, a magnetic induction scheme, an electromagnetic wave scheme, etc. Additional circuits (e.g., a coil loop, a resonance circuit, a rectifier, etc.) for wireless charging may be further included. The battery gauge may measure, for example, the residual quantity of the battery 396, and a voltage, current, or temperature while charging. The battery 396 may include, for example, a rechargeable battery or a solar battery.

According to an embodiment, the indicator 397 may indicate a specific state (e.g., a booting state, a message state, a charging state, etc.) of the electronic device 301 or a part (e.g., the processor 310) thereof. The motor 398 may convert an electrical signal into a mechanical vibration and may generate a vibration, a haptic effect, etc. Although not illustrated, the electronic device 301 may include a processing unit (e.g., a GPU) for supporting mobile TV. The processing unit for supporting mobile TV may process media data according to a standard, such as Digital Multimedia Broadcasting (DMB), Digital Video Broadcasting (DVB), mediaFlo™, etc.

Each of the above-described component elements of hardware according to the present disclosure may be configured with one or more components, and the names of the corresponding component elements may vary based on the type of electronic device 301. In various embodiments of the present disclosure, the electronic device 301 may include at least one of the above-described elements, and may exclude some of the elements or further include other additional elements. Further, some of the elements of the electronic device 301 according to various embodiments may be combined into one entity, so that the functions of the corresponding elements may be performed in the same way as those before they are combined.

Figure 4:
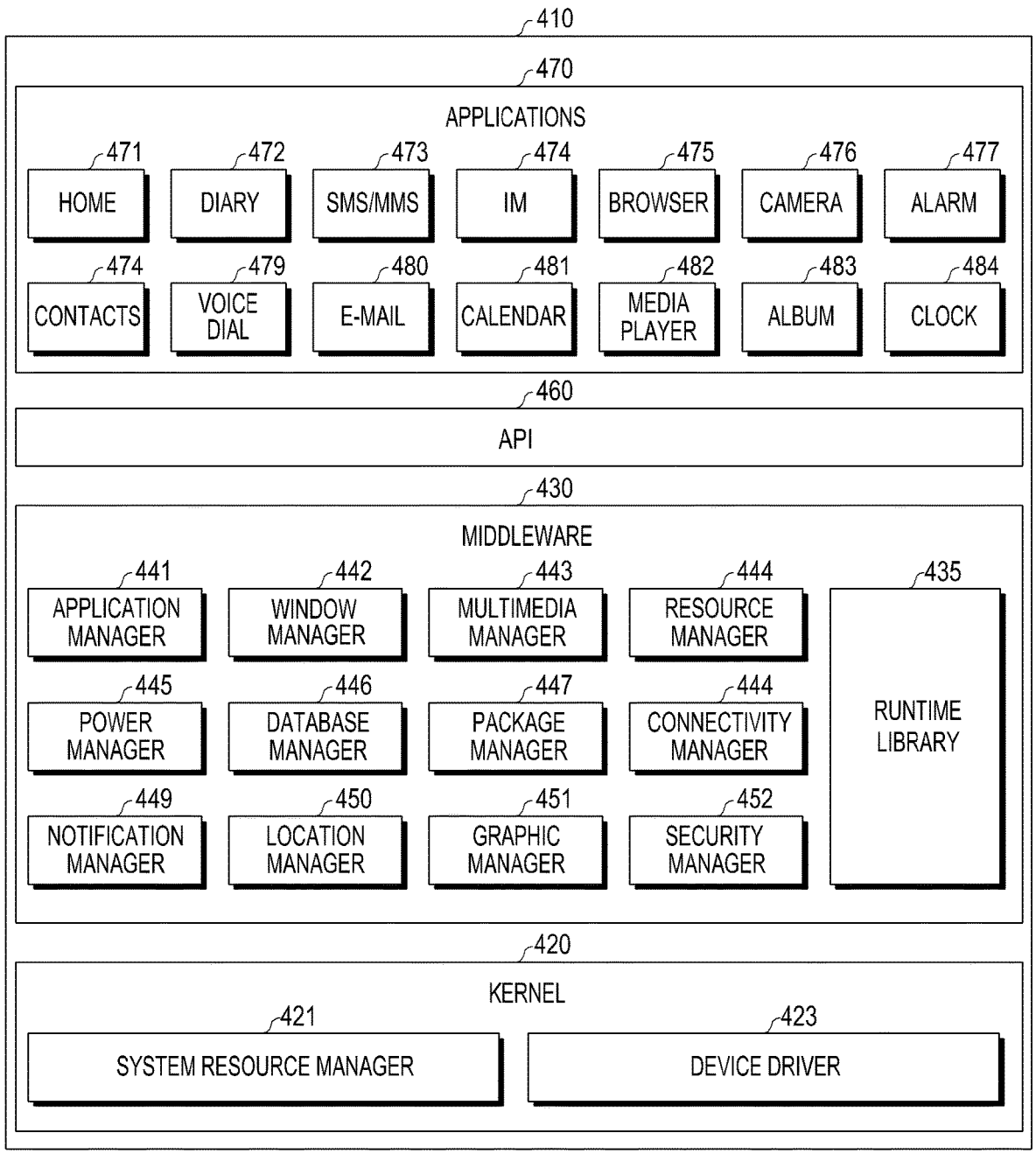
FIG. 4 is a block diagram of a program module according to various embodiments of the present disclosure.

FIG. 4 is a block diagram of a program module according to various embodiments of the present disclosure.

According to an embodiment, the program module 410 (e.g., the program 240) may include an Operating System (OS) that controls resources related to an electronic device (e.g., the first electronic device 201) and/or various applications (e.g., the application programs 247) that are executed on the operating system. The operating system may be, for example, Android™, iOS™, Windows™, Symbian™, Tizen™, Bada™, etc.

The program module 410 may include a kernel 420, middleware 430, an Application Programming Interface (API) 460, and/or applications 470. At least part of the program module 410 may be preloaded on the electronic device, or may be downloaded from an external device (e.g., the external device 501, the second electronic device 204, the server 206, etc.).

According to an embodiment, the kernel 420 (e.g., the kernel 241) may include, for example, a system resource manager 421 and/or a device driver 423. The system resource manager 421 may control, allocate, or collect system resources. According to an embodiment, the system resource manager 421 may include a process manager, a memory manager, a file system manager, etc. The device driver 423 may include, for example, a display driver, a camera driver, a Bluetooth driver, a shared memory driver, a USB driver, a keypad driver, a WiFi driver, an audio driver, or an Inter-Process Communication (IPC) driver.

According to an embodiment, the middleware 430 may, for example, provide functions required by the applications 470 in common, or may provide various functions to the applications 470 through the API 460 such that the applications 470 may efficiently use the limited system resources within the electronic device (e.g., the first electronic device 201). According to an embodiment, the middleware 430 (e.g., the middleware 243) may include, for example, at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, and a security manager 452.

According to an embodiment, the runtime library 435 may include, for example, a library module that a compiler uses in order to add new functions through a programming language while the applications 470 are executed. The runtime library 435 may perform functions that are related to the management of input and output, the management of a memory, arithmetic functions, etc.

According to an embodiment, the application manager 441 may manage, for example, the life cycle of at least one of the applications 470. The window manager 442 may manage GUI resources that are used on a screen. The multimedia manager 443 may determine formats required to reproduce various media files and may encode or decode a media file using a codec appropriate for the corresponding format. The resource manager 444 may manage resources, such as a source code, a memory, a storage space, etc., of at least one of the applications 470.

According to an embodiment, the power manager 445 may operate together with, for example, a Basic Input/Output System (BIOS) to manage the battery or power, and may provide power information required for operating the electronic device (e.g., the first electronic device 201). The database manager 446 may generate, search, or change a database to be used by at least one of the applications 470. The package manager 447 may manage the installation or update of an application that is distributed in the form of a package file.

According to an embodiment, the connectivity manager 448 may manage a wireless connection, such as WiFi, Bluetooth, etc. The notification manager 449 may display or notify of an event, such as an arrival message, an appointment, a proximity notification, etc., in such a manner as not to disturb a user. The location manager 450 may manage the location information of the electronic device (e.g., the first electronic device 201). The graphic manager 451 may manage a graphic effect to be provided to a user or a user interface related thereto. The security manager 452 may provide various security functions required for system security, user authentication, etc. According to an embodiment, in a case where the electronic device (e.g., the first electronic device 201) has a telephone call function, the middleware 430 may further include a telephony manager for managing a voice or video call function of the electronic device (e.g., the first electronic device 201).

According to an embodiment, the middleware 430 may include a middleware module that forms combinations of the various functions of the above-described elements. The middleware 430 may provide modules that are specialized according to the types of operating systems in order to provide differentiated functions. Furthermore, the middleware 430 may dynamically remove some of the existing elements, or may add new elements.

According to an embodiment, the API 460 (e.g., the API 245) is, for example, a set of API programming functions, and may be provided with different configurations according to operating systems. For example, in the case of Android or iOS, one API set may be provided for each platform. In the case of Tizen, two or more API sets may be provided for each platform.

According to an embodiment, the applications 470 (e.g., the application programs 247) may include one or more applications that can perform functions, for example, home 471, dialer 472, SMS/MMS 373, Instant Message (IM) 474, browser 475, camera 476, alarm 477, contacts 478, voice dial 479, e-mail 480, calendar 481, media player 482, album 483, clock 484, health care (e.g., measuring exercise quantity or blood sugar), environment information (e.g., providing atmospheric pressure, humidity, temperature information, etc.), and the like.

According to an embodiment, the applications 470 may include an application (hereinafter, for convenience of description, referred to as an "information exchange application") that supports information exchange between the electronic device (e.g., the first electronic device 201) and the external device (e.g., the external device 501, the second electronic device 204, or the server 206). The information exchange application may include a notification relay application for relaying specific information to the external device (e.g., the second electronic device 204, the server 206, or the external device 501) or a device management application for managing the external device (e.g., the second electronic device 204, the server 206, or the external device 501).

For example, the notification relay application may have a function of relaying notification information created by the other applications of the first electronic device 201 (e.g., the SMS/MMS application, the e-mail application, the health care application, and the environment information application) to the external device (e.g., the second electronic device 204, the server 206, or the external device 501). Furthermore, the notification relay application may receive notification information from the external device (e.g., the second electronic device 204, the server 206, or the external device 501) and may provide the received notification information to a user.

According to an embodiment, the device management application may manage (e.g., install, delete, or update), for example, at least one function of the external device (e.g., the second electronic device 204, the server 206, or the external device 501) communicating with the electronic device (e.g., the first electronic device) (e.g., turning on/off the external device itself (or some elements thereof) or adjusting the brightness (or resolution) of a display), applications executed in the external device, or services (e.g., a telephone call service, a message service, etc.) provided by the external device.

According to an embodiment, the applications 470 may include applications (e.g., a health care application of a mobile medical appliance, etc.) that are specified according to the attributes of the external device (e.g., the second electronic device 204, the server 206, or the external device 501). According to an embodiment, the applications 470 may include applications received from the external device (e.g., the second electronic device 204, the server 206, or the external device 501). According to an embodiment, the applications 470 may include preloaded applications or third-party applications that can be downloaded from a server (e.g., the server 206). The names of the elements of the program module 410, according to the above-described embodiment, may vary depending on the type of operating system.

According to various embodiments, at least part of the program module 410 may be implemented in software, firmware, hardware, or a combination of two or more thereof. At least part of the program module 410 may be implemented (e.g., executed) by, for example, a processor (e.g., the processor 310). At least part of the program module 410 may include, for example, a module, a program, a routine, a set of instructions, a process, etc. for performing one or more functions.

Figure 5:
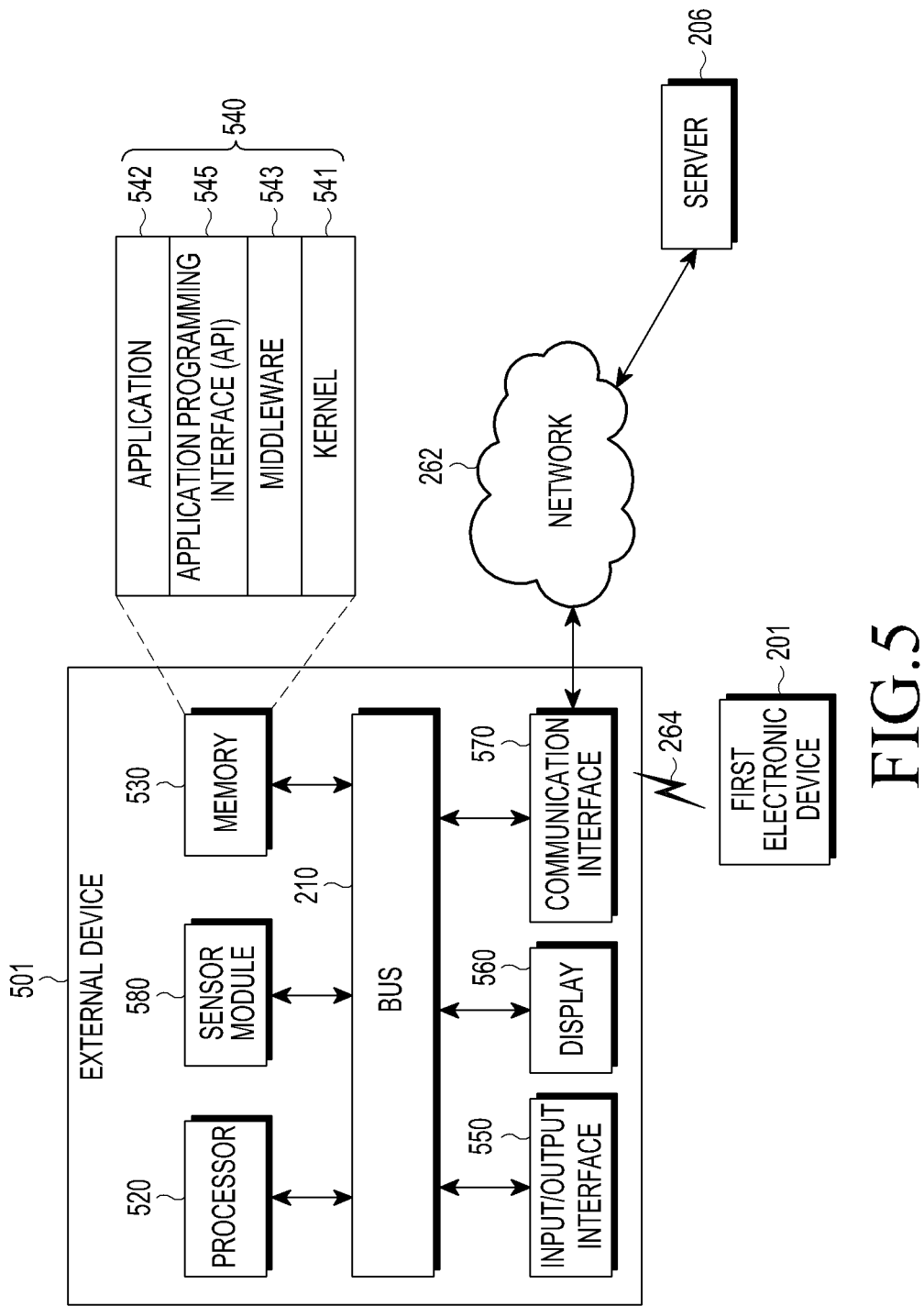
FIG. 5 is a diagram illustrating a network environment that includes an external device controlled by an electronic device, according to various embodiments of the present disclosure.

FIG. 5 is a diagram illustrating a network environment system 500 that includes the external device 501 that can be controlled by the first electronic device 201, according to various embodiments of the present disclosure. The external device 501 within the network environment system, according to various embodiments, will be described with reference to FIG. 5.

The electronic device 501 may include at least one of a bus 510, a processor 520, a memory 530, an input/output interface 550, a display 560, and a communication interface 570, or a sensor module 580. In some embodiments, the external device 501 may omit at least one of the elements, or may further include other elements.

According to an embodiment, the bus 510 may include, for example, a circuit that connects the elements 520 to 580 with each other and transfers communication (e.g., control messages and/or data) between the elements.

The processor 520 may include one or more of a Central Processing Unit (CPU), an Application Processor (AP), and a Communication Processor (CP). For example, the processor 520 may carry out operations or data processing related to the control and/or communication of at least one other element of the external device 501.

According to an embodiment, the processor 520 may determine the action, physical state, or emotional state of a user that uses the external device 501 based on sensing data measured by the sensor module 580. The processor 520 may generate user information for representing the user's action, physical state, or emotional state. The processor 520 may transmit the user information to the first electronic device 201. According to another embodiment, the processor 520 may control the external device 501 to operate based on the user information.

According to an embodiment, the memory 530 may include a volatile memory and/or a non-volatile memory. The memory 530 may store, for example, instructions or data related to at least one other element of the external device 501. According to an embodiment, the memory 530 may store software and/or a program 540. The program 540 may include, for example, a kernel 541, middleware 543, an Application Programming Interface (API) 545, and/or application programs (or "applications") 547. At least some of the kernel 541, the middleware 543, and the API 545 may be referred to as an Operating System (OS).

According to another embodiment, the memory 530 may store the user information generated by the processor 520 or user information on a user of the first electronic device 201, which is received from the first electronic device 201.

According to an embodiment, the kernel 541 may control or manage the system resources (e.g., the bus 510, the processor 520, the memory 530, etc.) that are used to execute operations or functions implemented in the other programs (e.g., the middleware 543, the API 545, and the application 547). Furthermore, the kernel 541 may provide an interface through which the middleware 543, the API 545, or the application programs 547 may access the individual elements of the external device 501 to control or manage the system resources.

According to an embodiment, the middleware 543 may function as an intermediary for allowing the API 545 or the application programs 547 to communicate with the kernel 541 to exchange data.

According to an embodiment, the middleware 543 may process one or more task requests, which are received from the application programs 547, according to priorities thereof. For example, the middleware 543 may assign priorities for using the system resources (e.g., the bus 510, the processor 520, the memory 530, etc.) of the external device 501 to one or more of the application programs 547. For example, the middleware 543 may perform scheduling or load balancing on the one or more task requests by processing the one or more task requests according to the priorities assigned to the one or more application programs.

According to an embodiment, the API 545 is an interface used by the applications 547 to control a function provided from the kernel 541 or the middleware 543, and may include, for example, at least one interface or function (e.g., instruction) for file control, window control, image processing, a text control, etc.

According to an embodiment, the input/output interface 550 may function as an interface that forwards instructions or data, which is input from the user or an electronic device (e.g., the first electronic device 201), to the other element(s) of the external device 501. In addition, the input/output interface 550 may output instructions or data received from the other element(s) of the external device 501 to the user or the electronic device (e.g., the first electronic device 201).

According to an embodiment, the input/output interface 550 may receive a user input for controlling the external device 501 or information related to the user's action, physical state, or emotional state, namely, information for generating user information from the user.

According to an embodiment, the display 560 may include a Liquid Crystal Display (LCD), a Light Emitting Diode (LED) display, an Organic Light Emitting Diode (OLED) display, a Micro Electro Mechanical System (MEMS) display, or an electronic paper display. The display 560 may display, for example, various types of content (e.g., text, images, videos, icons, symbols, etc.) for the user. The display 560 may include a touch screen and may receive, for example, a touch input, a gesture input, a proximity input, or a hovering input using an electronic pen or a part of the user's body.

According to an embodiment, the display 560 may display user information for representing the action, physical state, or emotional state of the user that uses the external device 501. The display 560 may also display the current state or control state of the external device 501.

According to an embodiment, the communication interface 570 may set communication between the external device 501 and an external device (e.g., the electronic device 201 or 204 or the server 206). For example, the communication interface 570 may be connected to the network 262 through wireless or wired communication to communicate with the external device (e.g., the first electronic device 201 or the server 206). According to an embodiment, the communication interface 570 may receive user information on the user that uses the first electronic device 201.

According to an embodiment, the wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. Furthermore, the wireless communication may include, for example, short range communication 564. The short range communication 564 may include, for example, at least one of WiFi, Bluetooth, Near Field Communication (NFC), Global Navigation Satellite System (GNSS), etc. The GNSS may include, for example, at least one of a Global Positioning System (GPS), a Global navigation satellite system (Glonass), a Beidou navigation satellite system (hereinafter, referred to as "Beidou"), and Galileo (European global satellite-based navigation system) according to the place of use or the bandwidth thereof. Hereinafter, the term "GPS" may be interchangeably used with the term "GNSS" in the present disclosure. The wired communication may include, for example, at least one of a Universal Serial Bus (USB), a High Definition Multimedia Interface (HDMI), Recommended Standard 232 (RS-232), a Plain Old Telephone Service (POTS), etc.

According to an embodiment, the network 262 may be a telecommunication network, for example, a computer network (e.g., a LAN or a WAN), the Internet, or a telephone network.

According to an embodiment, the sensor module 580 may measure a physical quantity or detect the operating state of the external device 501 and may convert the measured or detected information into an electronic signal. The sensor module 580 may include, for example, at least one of a gesture sensor, a gyro sensor, an atmospheric pressure sensor, a magnetic sensor, an acceleration sensor, a grip sensor, a proximity sensor, a color sensor (e.g., a Red, Green, and Blue (RGB) sensor), a biometric sensor, a temperature/humidity sensor, an illumination sensor, and an Ultraviolet (UV) sensor. Additionally or alternatively, the sensor module 580 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 580 may further include a control circuit for controlling one or more sensors included therein. In some embodiments, the electronic device 501 may further include a processor configured to control the sensor module 580 as a part of, or separately from, the processor 520, and may control the sensor module 580 while the processor 520 is in a sleep state.

An external device controlled by an electronic device according to various embodiments of the present disclosure, may include: a communication interface; and a processor configured to: receive, from an electronic device, a request for transmitting device information related to the external device through the communication interface, transmit the device information to the electronic device through the communication interface, receive shared information required for controlling the external device from the electronic device through the communication interface, and receive a first control signal based on the device information or the shared information from the electronic device through the communication interface.

Figure 6:
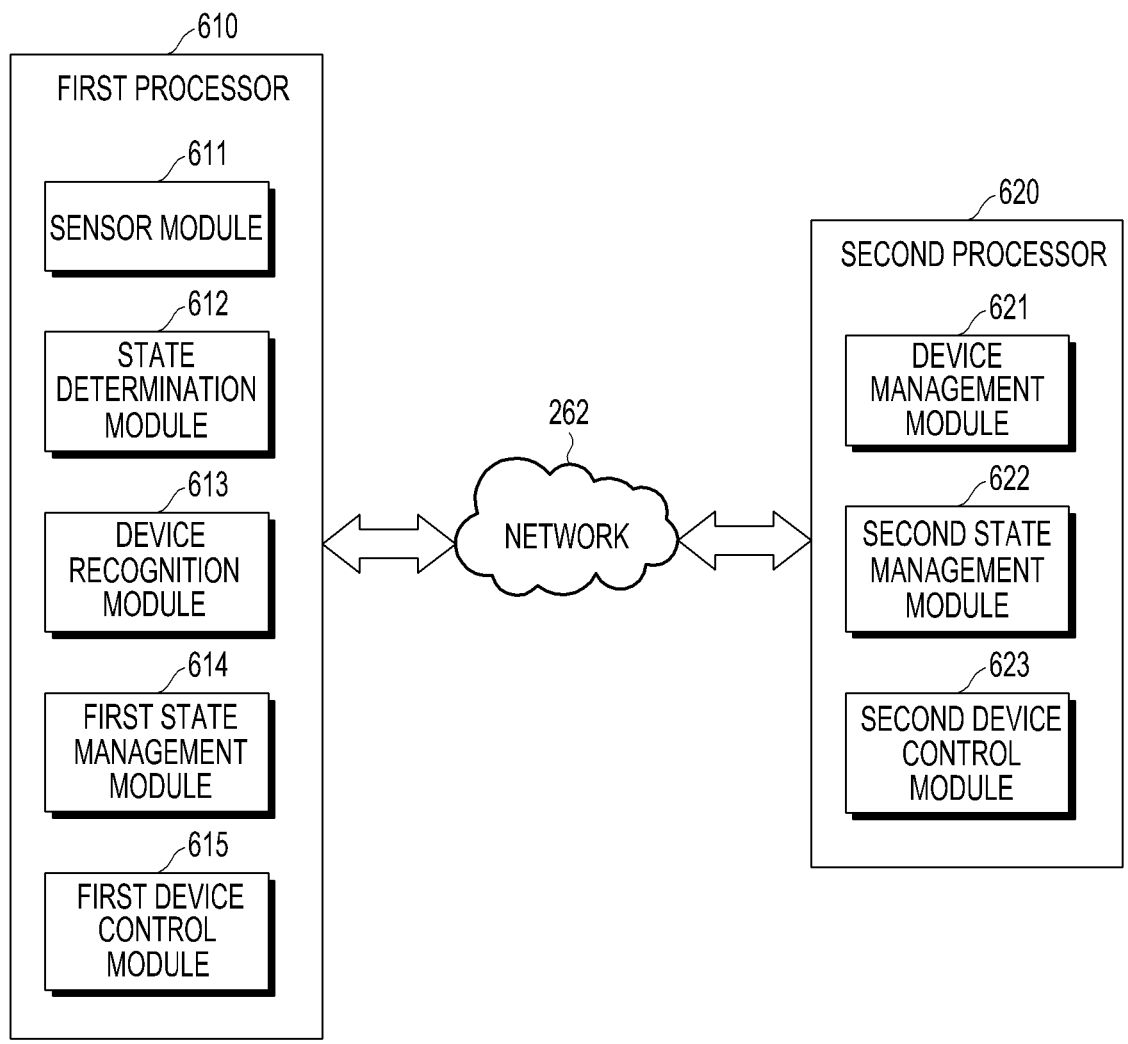
FIG. 6 is a diagram illustrating an example of a processor in an electronic device and a processor in an external device, according to various embodiments of the present disclosure.

FIG. 6 is a diagram illustrating an example of a processor 610 in the first electronic device 201 and a processor 620 in the external device 501, according to various embodiments of the present disclosure.

In FIG. 6, the first electronic device 201 and the external device 501 may be connected to each other through the network 262 or 264. Accordingly, the first processor 610 of the first electronic device 201 and the second processor 620 of the external device 501 may transmit and receive data through the communication interfaces 270 and 570. Further, the network 262 or 264 may be a short range communication network or a long range communication network. The first processor 610 may be implemented to be included in the processor 220 of the first electronic device 201, and the second processor 620 may be implemented to be included in the processor 520 of the external device 501.

Referring to FIG. 6, the first processor 610 included in the first electronic device 201 may include at least one of a state determination module 612, a device recognition module 613, a first state management module 614, or a first device control module 615, and may be implemented to further include a sensor module 611. The second processor 620 included in the external device 501 may include at least one of a device management module 621, a second state management module 622, or a second device control module 623. According to an embodiment, the second processor 620 included in the external device 501 may also be implemented to further include the sensor module 580.

According to an embodiment, the sensor module 611 of the first electronic device 201 may include one or more biometric sensors, such as a pedometer, a blood pressure meter, a blood glucose meter, a PPG, an ECG, an EMG, an EEG, an oxygen saturation measurement sensor, a skin moisture measurement sensor, a body fat analyzer, a body temperature sensor, etc., to measure a user's physical or emotional state. Furthermore, the sensor module 611 may include a fingerprint sensor, an iris sensor, a face recognizer, a hand geometry recognizer, a hand vascular pattern recognizer, a voice recognizer, a handwritten signature recognizer, etc. to recognize the user's biometric features. In addition, the sensor module 611 may further include a camera module, an IR camera module, a touch sensor, a microphone, etc. to recognize the user's biometric features.

According to an embodiment, the sensor module 611 may collect, from a user, one or more biometric signals related to the user. For example, the sensor module 611 may collect a biometric signal, which is raw data, by: measuring the user's blood pressure, blood flow rate, heart rate (HRM or HRV), body temperature, respiration rate, saturation of oxygen, blood glucose, waistline, height, weight, body fat, calorie consumption, brain wave, skin resistance, electromyogram, or electrocardiogram; detecting the user's heart and lung sounds, voice, or walking; photographing the user's ultrasonic image; or observing or photographing the user's sleeping state, face, pupil dilation, or blinking.

According to an embodiment, the sensor module 611 may determine (or extract) primary biometric feature information by analyzing the biometric signals. The primary biometric feature information is information that includes the user's biometric feature, and may include the user's average heart rate, heart rate distribution, etc. For example, a Heart Rate Variability (HRV) sensor may measure the user's pulse wave signal. The pulse wave signal may be referred to as a biometric signal. The sensor module 611 or the first processor 610 may also obtain primary biometric feature information, such as the user's average heart rate, heart rate distribution, etc., by analyzing the pulse wave signal. Furthermore, the sensor module 611 or the first processor 610 may determine the user's stress state and vascular aging and may generate secondary biometric feature information, including the user's stress state and vascular aging, by analyzing the primary biometric feature information.

According to an embodiment, the sensor module 611 may include its own processor (not illustrated) capable of analyzing the biometric signals collected by the sensor module 611 and generating primary biometric feature information or secondary biometric feature information. Further, the biometric signals collected through the sensor module 611 may be transferred to, and analyzed by, the self-processor coupled to the sensor module 611 or the first processor 610. The self-processor or the first processor 610 may generate primary biometric feature information related to the user, using the biometric signals.

For example, the first electronic device 201 implemented in the form of a mobile phone may include an ECG sensor, or the first electronic device 201 implemented in the form of a watch may include a PPG sensor. The first electronic device 201 that includes the sensor module 611 may transmit a biometric signal measured through the ECG sensor to a remote device or the server 206 through a wired or wireless network. The remote device or the server 206 may generate primary biometric feature information (e.g., information that includes the user's average heart rate, heart rate distribution, etc.) using the biometric signal.

According to an embodiment, the first electronic device 201 that includes the sensor module 611 may also generate primary biometric feature information to transmit the same to a remote device or the server 206. The remote device or the server 206 may generate secondary biometric feature information using the primary biometric feature information.

For example, a biometric signal collected by an HRV sensor that is embedded in a watch-type device, which is the first electronic device 201, may be transferred to a smart phone (e.g., the electronic device 204) that is wirelessly connected to the watch-type device. The smart phone may analyze the biometric signal to generate secondary biometric feature information related to the user that uses the first electronic device 201. The smart phone may display the secondary biometric feature information through the display thereof, or may transmit the secondary biometric feature information to the watch-type device. The watch-type device, which is the first electronic device 201, may display the secondary biometric feature information, which is received from the smart phone, through the display 160.

In another example, in a case where the first electronic device 201 is implemented as an ear clip in which an HRV sensor is embedded, a biometric signal collected by the HRV sensor may be transferred to the second electronic device 204 (e.g., a watch-type device or a smart phone) that is connected to the first electronic device 201. The watch-type device or the smart phone may generate primary biometric feature information using the biometric signal, and the primary biometric feature information may be transferred to the first electronic device 201 or one or more other devices (e.g., the server 206). It is assumed that the primary biometric feature information was generated by the smart phone and was transferred to the watch-type device or the ear clip.

The watch-type device may display the primary biometric feature information through the display thereof, and the ear clip may provide the primary biometric feature information to the user through audio guidance.

According to an embodiment, the sensor module 611 may further include at least part of a touch sensor, a key input detection sensor, a shock detection sensor, and a vibration detection sensor, and may also detect the connection of a wired/wireless device. The touch sensor, the key input detection sensor, the shock detection sensor, or the vibration detection sensor may detect a touch, a key input of a user, a shock, or a vibration that are applied to the first electronic device 201, respectively, and may generate electrical signals related thereto. Further, when the sensor module 611 detects the connection of a wired/wireless device, the sensor module 611 may generate a control signal for informing of the connection of the wired/wireless device.

According to an embodiment, one sensor included in the sensor module 611 may detect two or more pieces of information. For example, an acceleration sensor may simultaneously measure a user's motion and steps. A PPG sensor may measure a user's heart rate, and may be used as a biometric information sensor that measures the degree of stress of a user, or may be used as a proximity sensor on the basis of the amount of received light.

According to an embodiment, by analyzing an ECG signal generated by an ECG sensor that measures a user's electrocardiogram, the first processor 610 may analyze the user's electrocardiogram and may determine the user's emotion, heart rate, and Heart Rate variation (HRV) through the analysis of the electrocardiogram. The information, such as the ECG signal, the electrocardiogram, or the user's emotion, heart rate, or HRV, may be used to identify and authenticate the user.

According to an embodiment, one or more sensors included in the sensor module 611 may always be driven while the first electronic device 201 is turned on. According to another embodiment, the one or more sensors may be driven according to a user input (e.g., a key input, a button input, a GUI input, a gesture input, etc.). According to yet another embodiment, when one sensor operates, another sensor related to it may be automatically driven. For example, when a user starts to move, an acceleration sensor may be driven, and thereafter, a gyro sensor or PPG sensor related to the acceleration sensor may be automatically driven.

According to an embodiment, the sensor module 611 that includes the one or more sensors may also be embedded in the first electronic device 201. Further, the one or more sensors may be embedded in another electronic device (e.g., the electronic device 204 or the external device 501), or may be installed in an external environment (e.g., indoors, outdoors, or in a building, a base station, etc.).

According to an embodiment, the state determination module 612 may determine a user's physical or emotional state based on sensing data (e.g., a biometric signal or primary biometric feature information) measured by the sensor module 611. The state determination module 612 may generate user information for representing the user's physical or emotional state. The user information generated by the state determination module 612 may include motion information, biometric information, or environment information. Table 1 shows the types of sensors that generate sensing data for determining the motion information, the biometric information, the environment information, and parameters that are included in the motion information, the biometric information, or the environment information.

TABLE 1

| Classification of Information | Sensor | Parameter |
|---|---|---|
| Motion Information | Acceleration Sensor, Gyro Sensor, Camera Module, Kinect, or Infrared Sensor | Classification of User's Motions (Walking, Running, Cycling, etc.) by Motion Pattern, Determination of Fitness Motion Type by Pose and Motion Pattern, or Sleeping State |
| Biometric Information | PPG Sensor or ECG Sensor | Heart Rate, HRV, Blood Vascular Compliance, Saturation of Oxygen, Degree of Stress, Emotional State, etc. |
| | Skin Diagnostic Instrument | Skin Hydration Value, or Determination of Sweating |
| | Clinical Thermometer | Body Temperature or Ambient Environment Temperature |
| | Electromyogram Sensor | Electromyogram |
| | Blood Pressure Meter, Blood Glucose Meter, EMG, EEG, or Body Fat Analyzer | Blood Pressure, Blood Glucose, Electromyogram, Joint State, Brain Wave (Alpha, Beta, Gamma, Delta, and Theta), Sleeping State, or Degree of Obesity |
| Environment Information | UV Sensor, Illumination Sensor, Gas Sensor, Atmospheric Pressure Sensor, Position Sensor, Orientation Sensor, or Terrestrial Magnetism Sensor | Ultraviolet Index, Ambient Brightness, Detection of Gas or Odor Causing Risk or Unpleasant Feeling, Measurement of Height of Electronic Device, Measurement of Indoor/Outdoor Position of Electronic Device, or Determination of Direction of Electronic Device. |

According to another embodiment, the state determination module 612 may also generate the state information using life logging information (e.g., medical data, credit card payment information, mail information, a pattern of usage of an application, etc.) that the server 206, which is an external device, collects with a Personal Health Record (PHR) or an Electrical Health Record (EHR).

For example, a PPG sensor or ECG sensor included in the sensor module 611 may measure a user's heart rate, HRV, vascular compliance, or oxygen saturation. The sensor module 611 or the state determination module 612 may determine the degree of stress or emotional state of the user based on the user's heart rate, HRV, vascular compliance, or oxygen saturation that is measured using the PPG sensor or ECG sensor. Further, the state determination module 612 may generate (or determine) at least one of the user's heart rate, HRV, vascular compliance, degree of stress, or emotional state as biometric information among the state information related to the user.

According to an embodiment, the device recognition module 613 may collect information on devices (e.g., the vehicle 140, the home devices 151 to 153, etc.) to be controlled by the first electronic device 201 according to a user input. Further, the device recognition module 613 may manage a connection between the first electronic device 201 and the devices to be controlled by the first electronic device 201.

According to an embodiment, the device recognition module 613 may collect or determine: current operating state information for representing the current operating state of the external device 501; the type of user information that may be used in the external device 501; information (e.g., control history information, state information used by the external device 501, previous state sharing information, etc.) stored by another electronic device (e.g., the second electronic device 204); and capability information of the external device 501 (e.g., the type, operating range, operation step, and the like of the external device 501).

According to an embodiment, the device recognition module 613 may determine whether the service area of the external device 501 is a private area or a public area. The private area may be an area where a user of the first electronic device 201 independently uses the external device 501. The public area may be an area where other users, except the user of the first electronic device 201, can also control the external device 501 using the first electronic device 201 or another electronic device (e.g., the second electronic device 204, etc.).

According to an embodiment, the first state management module 614 may determine information (hereinafter, referred to as "shared information") to be shared with the external device 501 among the user's physical or emotional state information determined by the state determination module 612 and the biometric feature information measured by the sensor module 611. When the shared information is determined, the first state management module 614 may transmit the shared information to the external device 501 through the communication interface 270 of the first electronic device 201.

According to an embodiment, the first state management module 614 may determine a user's state information sharing type or sharing level according to the level of authentication between the external device 501 and the user. The first state management module 614 may determine when the user shares a state with the external device 501. The first state management module 614 may determine whether to share a state with the external device 501, for example, whether to share user information with the external device 501, or whether to transmit user information to the external device 501, in consideration of the value or service quality of the external device 501. The first state management module 614 may determine the sharing range of user information or the sharing level of the user information in consideration of the type of external device 501. The user information may be separately managed in a reservoir with a high security level inside the first electronic device 201. The first state management module 614 may determine the update period or the number of updates of the user information according to a change in the user information related to the user. Further, the first state management module 614 may set or manage the effective period of the user information.

According to an embodiment, the first device control module 615 of the first processor 610 may generate a control signal for controlling a device to be controlled, namely, the external device 501. The first device control module 615 may control the communication interface 270 of the first electronic device 201 to transmit the control signal. The first device control module 615 may determine the operation of the external device 501 based on user information or sensing data (a biometric signal) measured through the sensor module 611, primary biometric feature information, or secondary biometric feature information. The first device control module 615 may generate the control signal based on the determined operation of the external device 501. According to an embodiment, the control signal may be automatically generated based on the user information, the sensing data, the primary biometric feature information, or the secondary biometric feature information. According to another embodiment, the control signal may be manually generated according to a user input based on the user information, the sensing data, the primary biometric feature information, or the secondary biometric feature information.

According to an embodiment, in a case where a control signal is separately generated in a device (e.g., a set-top box, the external device 501, etc.), except the first electronic device 201, even though the first electronic device 201 generates a control signal and transmits the same to the external device 501, the control signal generated by the first electronic device 201 may not be applied to the external device 501.

According to an embodiment, the first electronic device 201 may be a portable device, such as a smart phone, a wearable device, etc., which can be connected to the external device 501 using a short or long range communication means in a wired or wireless manner, and may be implemented in the form of a cloud server, which can generate a control signal, on a network.

According to an embodiment, the device management module 621 of the external device 501 may manage information on the external device 501. Further, the device management module 621 may manage the connection between the first electronic device 201 and the external device 501.

According to an embodiment, the device management module 621 may collect or determine: current operating state information for representing the current operating state of the external device 501; the type or range of user information that may be used in the external device 501; information (e.g., control history information, state information used by the external device 501, previous state sharing information, etc.) stored by another electronic device (e.g., the second electronic device 204); or capability information of the external device 501 (e.g., the type, operating range, operation step, and the like of the external device 501).

According to an embodiment, the device management module 621 may determine whether the service area of the external device 501 is a private area or a public area. The private area may be an area where a user of the first electronic device 201 independently uses the external device 501. The public area may be an area where other users, except the user of the first electronic device 201, can control the external device 501 using an electronic device (e.g., the second electronic device 204, etc.).

According to an embodiment, the second state management module 622 may store and manage user information received from the first electronic device 201, for example, health information for representing a physical state, feeling information for representing an emotional state, or biometric feature information measured by the sensor module 611. In this case, the user information that the external device 501 receives from the first electronic device 201 may be shared information that is shared with the external device 501.

According to an embodiment, the second state management module 622 may determine sharing type or sharing level of user information according to the level of authentication between the external device 501 and a user. The second state management module 622 may determine the sharing range or sharing level of the user information in consideration of the type of external device 501. The user information may be separately managed in a reservoir with a high security level inside the external device 501. The second state management module 622 may determine the update period or the number of updates of the user information according to a change in the user information. Further, the second state management module 622 may set or manage the effective period of the user information.

The second device control module 623 may generate a control signal for controlling the external device 501. The second device control module 623 may determine the operation of the external device 501 based on user information or sensing data (a biometric signal) measured through the sensor module 611, primary biometric feature information, or secondary biometric feature information. The second device control module 623 may generate the control signal based on the determined operation of the external device 501. According to an embodiment, the control signal may be automatically generated based on the user information, the sensing data, the primary biometric feature information, or the secondary biometric feature information. According to another embodiment, the control signal may be manually generated according to a user input based on the user information, the sensing data, the primary biometric feature information, or the secondary biometric feature information.

According to an embodiment, in a case where conflicting control signals are received from a plurality of electronic devices 201 and 204, the second device control module 623 may manage the control signals. The second device control module 623 may prevent or compromise a conflict between the control signals using shared user information, namely, shared information. In a case where control signals are received from a plurality of electronic devices 201 and 204, respectively, the second device control module 623 may not apply the control signals to the external device 501, or may apply only a part of the control signals to the external device 501.

According to an embodiment, in a case where the external device 501 is implemented in the form of a set-top box, the external device 501 may be connected with a plurality of neighboring external devices and may generate control signals for controlling the plurality of devices, respectively. The external device 501 may not generate a separate control signal when receiving a control signal from the first electronic device 201.

According to an embodiment, the external device 501 may include: a set-top box that manages a plurality of external devices that may be connected to the external device 501 using a short range communication means or a long range communication means in a wired or wireless manner, or a device that performs a function similar to that of the set-top box; a device that includes a control module (e.g., the second processor 620) and operates separately; or devices mounted in a vehicle.

Figure 7A:
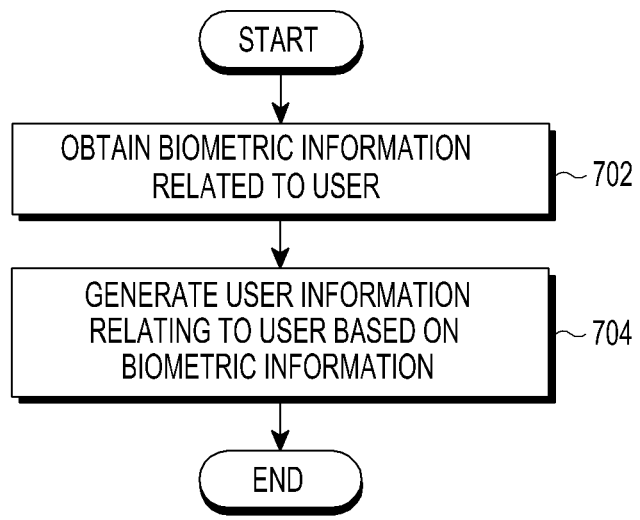
FIG. 7A is a flowchart illustrating a method of controlling an external device by an electronic device, according to various embodiments of the present disclosure.

FIG. 7A is a flowchart illustrating a method of controlling the external device 501 by the first electronic device 201, according to various embodiments of the present disclosure.

Referring to FIG. 7A, in operation 702, the first electronic device 201 may obtain biometric information related to a user of the first electronic device 201. According to an embodiment, the first electronic device 201 may obtain the biometric information by measuring a biometric signal related to the user through the sensor module 611 that is included in the first processor 610 of the first electronic device 201.

In operation 704, the first processor 610 of the first electronic device 201 may generate user information related to the user based on the biometric information and may store the user information in the memory 230. The first processor 610 of the first electronic device 201 may determine the current state of the user using the biometric information. The first processor 610 may generate the biometric information or information for representing the user's current state as the user information and may store the same in the memory 230 of the first electronic device 201.

A method for controlling an external device by an electronic device, according to various embodiments of the present disclosure, for solving such problems in the related art may include: obtaining biometric information related to a user of the electronic device; generating user information related to the user based on the biometric information; and storing the user information.

Figure 7B:
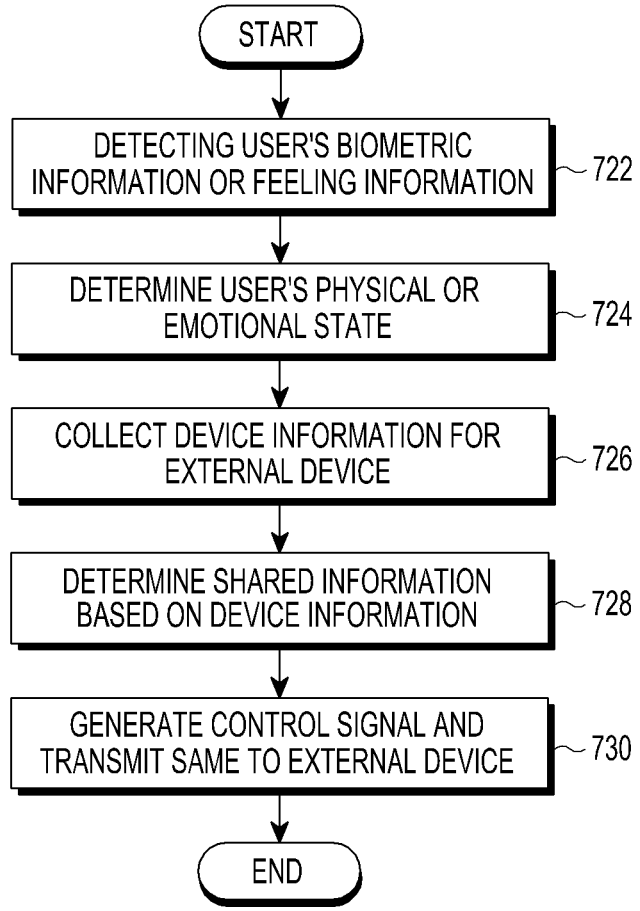
FIG. 7B is a flowchart illustrating a method of controlling an external device by an electronic device, according to various embodiments of the present disclosure.

FIG. 7B is a flowchart illustrating a method of controlling the external device 501 by the first electronic device 201, according to various embodiments of the present disclosure.

Referring to FIG. 7B, in operation 722, the first processor 610 of the first electronic device 201 may detect a user's biometric information or feeling information through the sensor module 611 mounted in the first electronic device 201. The data detected in operation 722 may include information for determining the user's emotional state or biometric information.

In operation 724, the first processor 610 may determine the emotional or physical state of the user that uses the first electronic device 201 based on the sensing data that is detected by the sensor module 611 in operation 722. According to an embodiment, in a case where the sensing data measured by the sensor module 611 corresponds to information on the user's surrounding environment, the first processor 610 may predict the user's physical or emotional state on the basis of the surrounding environment information.

In operation 726, the first processor 610 may collect device information for the external device 501 that is to be controlled by the first electronic device 201. In operation 726, the first processor 610 may determine, for example, a house, a vehicle, an office, a public place, or the external device 501 for controlling devices other than the external device 501, and may collect the device information for the external device 501. The device information may be collected through the device recognition module 613. The first processor 610 may request the device information, to the external device 501 through the communication interface 270 of the first electronic device 201 to receive the device information.

According to an embodiment, the external device 501 may manage the current state of the external device 501 and user information (i.e., shared information) that can be handled by the external device 501. In a case where the external device 501 has been controlled by another device (e.g., the second electronic device 204), user information shared with multiple users, namely, shared information corresponding to each user may have been stored in the external device 501. The shared information corresponding to each user may be managed by the second state management module 622 in the external device 501. The second state management module 622 may control the communication interface 570 of the external device 501 to transmit the shared information to the first electronic device 201 according to a preset information sharing rule. The information sharing rule may include the authentication operation performed between the first electronic device 201 and the external device 501, authority information, the service area of the external device 501, the effective period of the user information, etc.

In operation 728, the first processor 610 may determine shared information based on the device information. Using the device information, the first processor 610 may select (or determine) information that can be processed in the external device 501, among several types of health information or feeling information that is measured or analyzed by the first electronic device 201, to be the shared information. The first processor 610 may share the shared information with the external device 501 by selecting at least one of the user's health information or feeling information as the shared information and transmitting the shared information to the external device 501.

In operation 730, the first processor 610 may generate a control signal and may transmit the control signal to the external device 501. In this case, the first processor 610 may transmit the shared information and the control signal together. Further, the first processor 610 may generate a control signal for controlling the external device 501 on the basis of the user information. According to another embodiment, the first electronic device 201 may generate the control signal according to a user input that is received through the input/output interface 250.

A method in which an external device operates under the control of an electronic device, according to various embodiments of the present disclosure, may include: receiving, from the electronic device, a request for transmitting device information related to the external device; transmitting the device information to the electronic device; receiving shared information required for controlling the external device from the electronic device; and receiving, from the electronic device, a first control signal based on the device information or the shared information.

Figure 8:
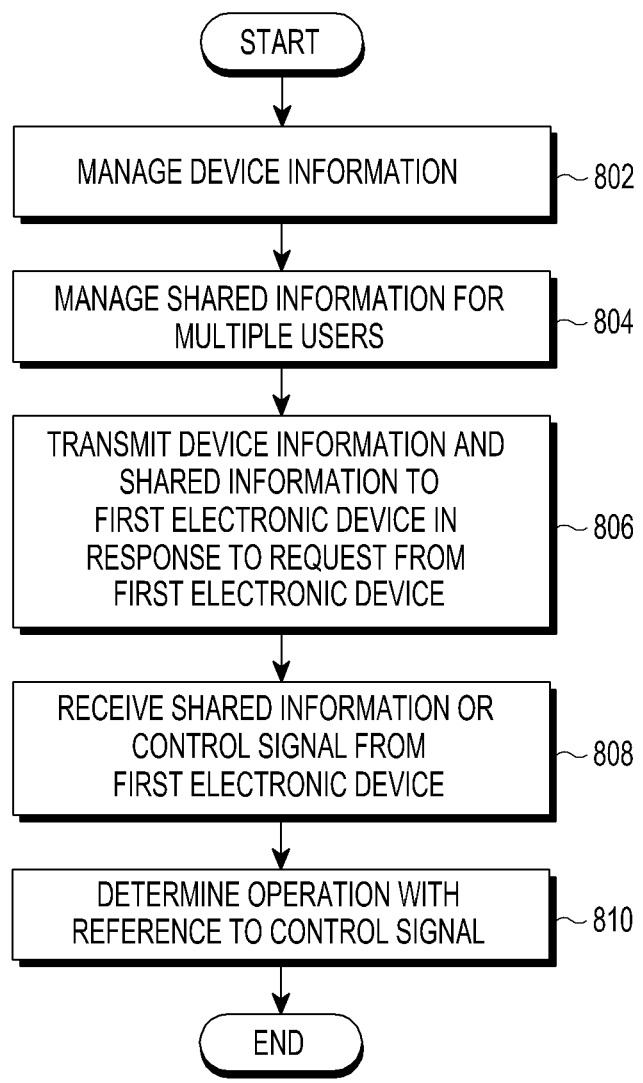
FIG. 8 is a flowchart illustrating a method in which an external device operates under the control of an electronic device, according to various embodiments of the present disclosure.

FIG. 8 is a flowchart illustrating a method in which the external device 501 operates under the control of the first electronic device 201, according to various embodiments of the present disclosure.

Referring to FIG. 8, in operation 802, the external device 501 may manage device information for the external device 501. In operation 804, the processor 620 of the external device 501 may manage shared information corresponding to each of a plurality of users. The external device 501 may receive user information, which corresponds to users of a plurality of electronic devices (e.g., the first electronic device 201 and the second electronic device 204) that try to control the external device 501, from the plurality of electronic devices 201 and 204 and may store the received user information. The second processor 620 may receive, for example, information related to the user's health or emotions (i.e., user information) from the first electronic device 201. In this case, the user information transmitted from the first electronic device 201 may be shared information corresponding to a range that can be managed by the external device 501. Namely, the external device 501 may receive shared information from the plurality of electronic devices (e.g., the first electronic device 201 and the second electronic device 204), and may store and manage the shared information.

According to an embodiment, in operation 806, the external device 501 may transmit the device information and the shared information stored therein to the first electronic device 201 in response to a request from the first electronic device 201. According to another embodiment, the external device 501 may inform the first electronic device 201 of one or more parameters that are required by the external device 501 among the corresponding user information (i.e., one or more parameters included in the shared information).

In operation 808, the external device 501 may receive shared information or a control signal from the first electronic device 201. In operation 801, the external device 501 may determine the operation thereof with reference to the control signal. According to an embodiment, the external device 501 may ignore the control signal received from the first electronic device 201, or may combine the received control signal with another control signal generated therein to control itself.

According to an embodiment, the external device 501 may receive two or more control signals from different electronic devices (e.g., the first electronic device 201 and the second electronic device 204). The second device control module 623 of the external device 501 may manage the priority for each electronic device. For example, the second device control module 623 may compare the priority for the first electronic device 201, which has transmitted the control signal (the first control signal) that is received in operation 808, with the priority for another electronic device that had transmitted the control signal (the second control signal) that was received before the first control signal. When the priority of the first electronic device 201 that has transmitted the first control signal is higher than that of the second electronic device 204 that had transmitted the second control signal, the second control module 623 may operate the external device 501 according to the first control signal or a combination of the first and second control signals. In contrast, when the priority of the first electronic device 201 that has transmitted the first control signal is lower than that of the second electronic device 204 that had transmitted the second control signal, the second control module 623 may operate the external device 501 according to the second control signal or a combination of the first and second control signals.

The operations of the first electronic device 201, the second electronic device 204, or the external device 501, illustrated in FIG. 7A, 7B, or 8, may not be executed according to the sequence illustrated in FIG. 7A, 7B, or 8, and the sequence of the operations may change according to a service or the operating method of the first electronic device 201, the second electronic device 204, or the external device 501.

Figure 9A:
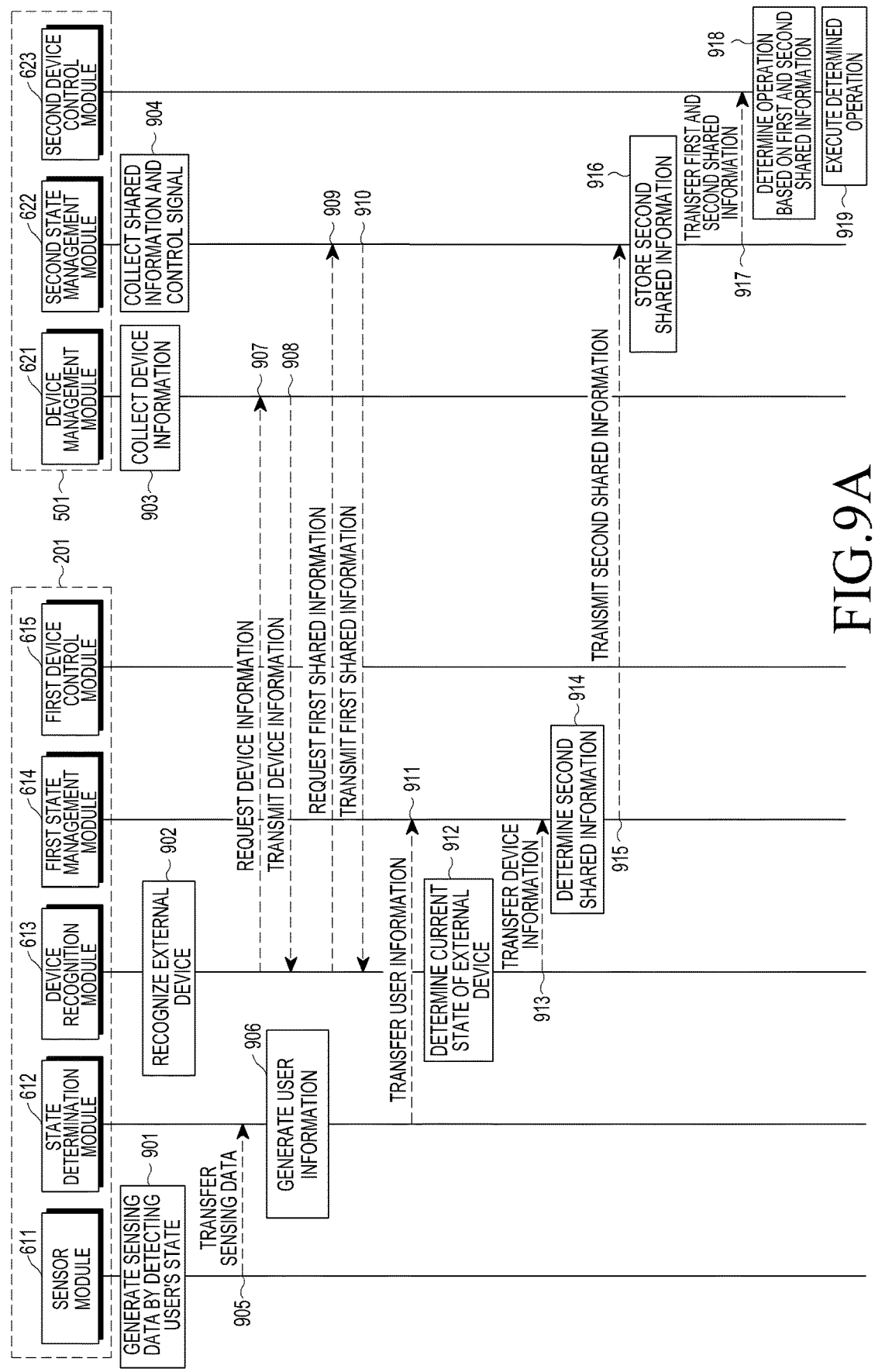
FIG. 9A is a flow diagram illustrating a method in which an electronic device and an external device operate, according to various embodiments of the present disclosure.

FIG. 9A is a flow diagram illustrating a method in which the first electronic device 201 and the external device 501 operate, according to various embodiments of the present disclosure.

Referring to FIG. 9A, in operation 901, the sensor module 611 included in the first processor 610 of the first electronic device 201 may generate sensing data by detecting a user's state, for example, the user's physical, emotional, or environmental state. In operation 905, the sensor module 611 may transfer the sensing data to the state determination module 612. In operation 906, the state determination module 612 may determine the user's physical or emotional state based on the sensing data and may generate user information that includes the user's physical or emotional state. In operation 911, the state determination module 612 may transfer the user information to the first state management module 614.

According to an embodiment, in operation 902, the device recognition module 613 may recognize the external device 501 that can be controlled by the first electronic device 201. According to an embodiment, the device recognition module 613 may recognize the external device 501 that is connected with the first electronic device 201 through the communication interface 270 of the first electronic device 201 in a wired or wireless manner. In operation 907, the device recognition module 613 may request device information for the external device 501 from the external device 501 through the communication interface 270 of the first electronic device 201. In operation 908, the device management module 621 of the external device 501 may transmit the device information to the first electronic device 201 through the communication interface 570 of the external device 501. According to an embodiment, the device management module 621 of the external device 501 may collect device information for the external device 501 in operation 903 prior to the operation 908. The device information collected by the device management module 621 in operation 903 may be, for example, information for representing the current state of the external device 501.

According to an embodiment, in operation 909, the device recognition module 613 of the first electronic device 201 may request first shared information from the external device 501 through the communication interface 270 of the first electronic device 201. The first shared information requested in operation 909 is at least part of the user information that is used to control the external device 501, and may differ from the user information that is generated by the state determination module 612 of the first electronic device 201 in operation 906. When the first shared information is requested as described above, the second state management module 622 of the external device 501 may transmit the first shared information, which is stored in the external device 501, to the device recognition module 613 of the first electronic device 201 through the communication interface 570 of the external device 501 in operation 910. According to an embodiment, the second state management module 622 of the external device 501 may collect shared information (e.g., the first shared information) or a control signal from other devices (e.g., the second electronic device 204), except the first electronic device 201, in operation 904 prior to the operation 909.

According to an embodiment, the device recognition module 613 of the first electronic device 201, which has received the first shared information from the external device 501 in operation 910, may determine the current state of the external device 501 in operation 912. In operation 913, the device recognition module 613 may forward the device information received from the external device 501 to the first state management module 614. In operation 914, the first state management module 614 that has received the device information may determine the second shared information to be transmitted to the external device 501.

According to an embodiment, in operation 915, the first state management module 614 may transmit the second shared information to the second state management module 622 of the external device 501 through the communication interface 270 of the first electronic device 201. In operation 916, the second state management module 622 may store the second shared information. According to an embodiment, the second state management module 622 may store the second shared information in the memory 530 of the external device 501. In operation 917, the second state management module 622 may forward the first shared information and the second shared information to the second device control module 623. The second device control module 623 may determine the operation of the external device 501 based on the first shared information and the second shared information in operation 918, and may execute the determined operation in operation 919.

Figure 9B:
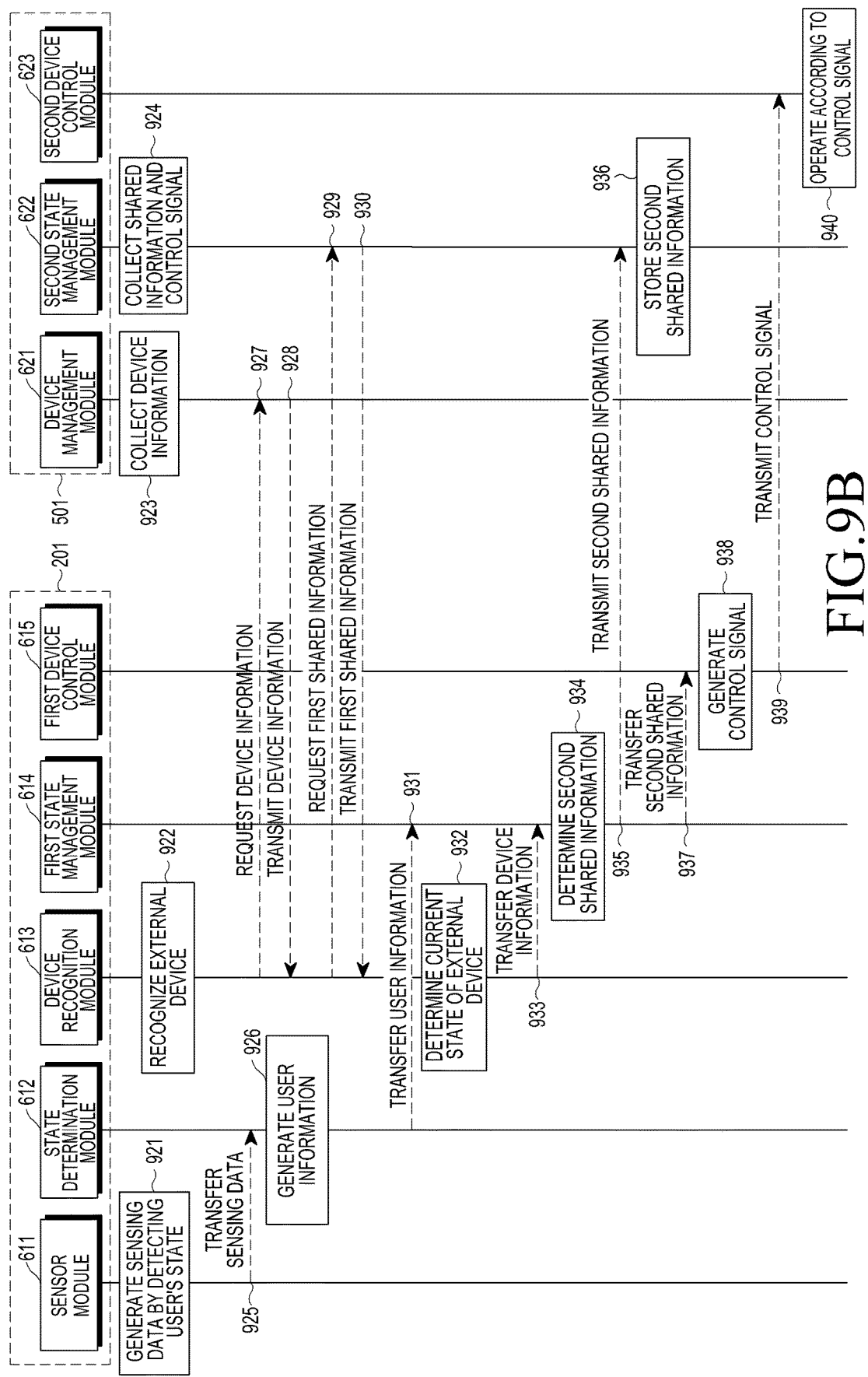
FIG. 9B is a flow diagram illustrating a method in which an electronic device and an external device operate, according to various embodiments of the present disclosure.

FIG. 9B is a flow diagram illustrating a method in which the first electronic device 201 and the external device 501 operate, according to various embodiments of the present disclosure.

Referring to FIG. 9B, in operation 921, the sensor module 611 of the first electronic device 201 may generate sensing data by detecting a user's state, for example, the user's physical, emotional, or environmental state. In operation 925, the sensor module 611 may transfer the sensing data to the state determination module 612. The state determination module 612 may determine the user's physical or emotional state based on the sensing data and may, in operation 926, generate user information that includes the user's physical or emotional state. In operation 931, the state determination module 612 may transfer the user information to the first state management module 614.

According to an embodiment, in operation 922, the device recognition module 613 may recognize the external device 501 that can be controlled by the first electronic device 201. According to an embodiment, the device recognition module 613 may recognize the external device 501 that is connected with the first electronic device 201 through the communication interface 270 of the first electronic device 201 in a wired or wireless manner. In operation 927, the device recognition module 613 may request device information for the external device 501 from the external device 501 through the communication interface 270 of the first electronic device 201. In operation 928, the device management module 621 of the external device 501 may transmit the device information to the first electronic device 201 through the communication interface 570 of the external device 501. According to an embodiment, the device management module 621 of the external device 501 may collect device information for the external device 501 in operation 923 prior to the operation 928. The device information collected by the device management module 621 in operation 923 may be, for example, information for representing the current state of the external device 501.

According to an embodiment, in operation 929, the device recognition module 613 of the first electronic device 201 may request first shared information from the external device 501 through the communication interface 270 of the first electronic device 201. The first shared information requested in operation 929 is at least part of user information that is used to control the external device 501, and may differ from the user information that is generated by the state determination module 612 of the first electronic device 201 in operation 926. When the first shared information is requested as described above, the second state management module 622 of the external device 501 may transmit the first shared information, which is stored in the external device 501, to the device recognition module 613 of the first electronic device 201 through the communication interface 570 of the external device 501 in operation 930. According to an embodiment, the second state management module 622 of the external device 501 may collect shared information (e.g., the first shared information) or a control signal from other devices (e.g., the second electronic device 204), except the first electronic device 201, in operation 924 prior to the operation 929.

According to an embodiment, the device recognition module 613 of the first electronic device 201, which has received the first shared information from the external device 501 in operation 930, may determine the current state of the external device 501 in operation 932. In operation 933, the device recognition module 613 may forward the device information received from the external device 501 to the first state management module 614. In operation 934, the first state management module 614 that has received the device information may determine the second shared information to be transmitted to the external device 501.

According to an embodiment, in operation 935, the first state management module 614 may transmit the second shared information to the second state management module 622 of the external device 501 through the communication interface 270 of the first electronic device 201. In operation 936, the second state management module 622 may store the second shared information. According to an embodiment, the second state management module 622 may store the second shared information in the memory 530 of the external device 501. In operation 937, the first state management module 614 may transfer the second shared information to the first device control module 615. In operation 938, the first device control module 615 may generate a control signal based on the second shared information. In operation 939, the first device control module 615 may transmit the control signal to the second device control module 623 of the external device 501. In operation 940, the second device control module 623 may control the external device 501 to operate according to the control signal.

Figure 9C:
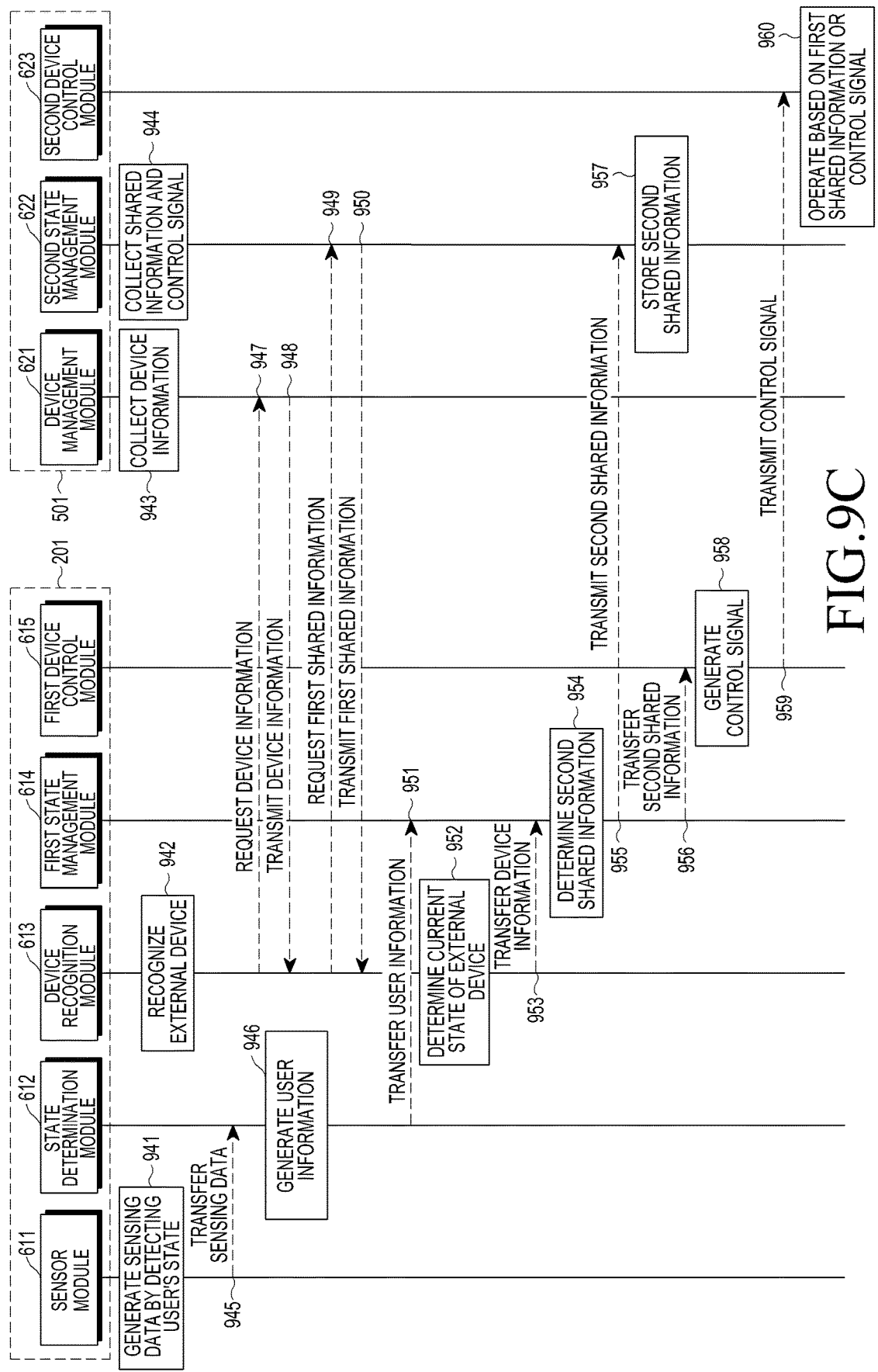
FIG. 9C is a flow diagram illustrating a method in which an electronic device and an external device operate, according to various embodiments of the present disclosure.

FIG. 9C is a flow diagram illustrating a method in which the first electronic device 201 and the external device 501 operate, according to various embodiments of the present disclosure.

Referring to FIG. 9C, in operation 941, the sensor module 611 of the first electronic device 201 may generate sensing data by detecting a user's state, for example, the user's physical, emotional, or environmental state. In operation 945, the sensor module 611 may transfer the sensing data to the state determination module 612. The state determination module 612 may determine the user's physical or emotional state based on the sensing data and may, in operation 946, generate user information that includes the user's physical or emotional state. In operation 951, the state determination module 612 may transfer the user information to the first state management module 614.

According to an embodiment, in operation 942, the device recognition module 613 may recognize the external device 501 that can be controlled by the first electronic device 201. According to an embodiment, the device recognition module 613 may recognize the external device 501 that is connected with the first electronic device 201 through the communication interface 270 of the first electronic device 201 in a wired or wireless manner. In operation 947, the device recognition module 613 may request device information for the external device 501 from the external device 501 through the communication interface 270 of the first electronic device 201. In operation 948, the device management module 621 of the external device 501 may transmit the device information to the first electronic device 201 through the communication interface 570 of the external device 501. According to an embodiment, the device management module 621 of the external device 501 may collect device information for the external device 501 in operation 943 prior to the operation 948. The device information collected by the device management module 621 in operation 943 may be, for example, information for representing the current state of the external device 501.

According to an embodiment, in operation 949, the device recognition module 613 of the first electronic device 201 may request the first shared information from the external device 501 through the communication interface 270 of the first electronic device 201. The first shared information requested in operation 949 is at least part of the user information that is used to control the external device 501, and may differ from the user information that is generated by the state determination module 612 of the first electronic device 201 in operation 946. When the first shared information is requested as described above, the second state management module 622 of the external device 501 may transmit the first shared information, which is stored in the external device 501, to the device recognition module 613 of the first electronic device 201 through the communication interface 570 of the external device 501 in operation 950. According to an embodiment, the second state management module 614 of the external device 501 may collect shared information (e.g., the first shared information) or a control signal from other devices (e.g., the second electronic device 204), except the first electronic device 201, in operation 944 prior to the operation 949.

According to an embodiment, the device recognition module 613 of the first electronic device 201, which has received the first shared information from the external device 501 in operation 950, may determine the current state of the external device 501 in operation 952. In operation 953, the device recognition module 613 may forward the device information received from the external device 501 to the first state management module 614. In operation 954, the first state management module 614 that has received the device information may determine the second shared information to be transmitted to the external device 501.

According to an embodiment, in operation 955, the first state management module 614 may transmit the second shared information to the second state management module 622 of the external device 501 through the communication interface 270 of the first electronic device 201. In operation 957, the second state management module 622 may store the second shared information. According to an embodiment, the second state management module 622 may store the second shared information in the memory 530 of the external device 501. In operation 956, the first state management module 614 may transfer the second shared information to the first device control module 615. In operation 958, the first device control module 615 may generate a control signal based on the second shared information. In operation 959, the first device control module 615 may transmit the control signal to the second device control module 623 of the external device 501. In operation 960, the second device control module 623 may control the operation of the external device 501 based on the first shared information or the control signal.

According to an embodiment, the external device 501 may operate based on the first shared information until the external device 501 receives the control signal from the first electronic device 201 in operation 959. The external device 501 may change the existing operation thereof after receiving the control signal in operation 959. According to an embodiment, the second device control module 623 may control the external device 501 to operate by reflecting the control signal received from the first electronic device 201 in the operation based on the first shared information.

FIG. 10 is a table that lists the user information that the electronic device 201 shares with external devices, according to various embodiments of the present disclosure.

Referring to the Table 1010 of FIG. 10, the user information may include: parameters included in a user's biometric information (e.g., blood glucose, blood pressure, flu, body temperature, respiration, skin moisture, heart rate, body fat, degree of fatigue, amount of sleep, weight, finger print/iris, etc.); parameters included in the user's feeling information (e.g., pleasure, sorrow, anger, high stress, depression, surprise, fear, etc.); and parameters included in the user's motion information (e.g., eating, sleeping, exercising, watching TV, chatting, working, studying, showering, cleaning, etc.).

According to an embodiment, at least some of the parameters included in the user information may be shared with the external devices 501. Home appliances (e.g., a television (TV), a living room light, a warehouse light, an air-conditioner, a heater, a refrigerator, a robot vacuum cleaner, a washing machine, a humidifier, a curtain opening/closing device, and a microwave oven), which are the external devices 501 illustrated in FIG. 10, may share some of the user information, as shared information, with the first electronic device 201. Namely, the first electronic device 201 may transmit, to the corresponding external device 501, only the parameter values required for controlling the external device 501. Taking Table 1010 of FIG. 10 for example, a heater may preferably share parameter values related to the user's blood pressure, flu, body temperature, respiration, skin moisture, heart rate, degree of fatigue, or amount of sleep and parameter values related to whether the user is eating, sleeping, exercising, working, studying, or showering, among the parameters included in the user information, with the first electronic device 201. However, the heater does not have to know parameter values related to the user's blood glucose, body fat, weight, or fingerprint/iris, parameter values related to the user's emotional state (pleasure, sorrow, anger, high stress, fun, depression, surprise, or fear), or parameter values related to whether the user is watching TV or chatting, among the parameters included in the user information. Accordingly, the first electronic device 201 may transmit only the following parameter values among the user information: the parameter values related to the user's blood pressure, flu, body temperature, respiration, skin moisture, heart rate, degree of fatigue, or amount of sleep and the parameter values related to whether the user is eating, sleeping, exercising, working, studying, or showering.

According to an embodiment, the external devices 501 may be classified into private devices that are owned by individuals, respectively, and public devices that are owned by a plurality of users. According to an embodiment, each private device may store user information (i.e., all parameter values) related to the user that owns the private device. Further, parameter values stored in each public device may vary according to a relationship between users that use the public device. For example, the public device may store all parameter values for each user. For example, in a case where the relationship between the users that use the public device corresponds to a family relationship, the public device may store all parameter values related to the users. For example, in a case where the relationship between the users that use the public device corresponds to a colleagueship, the public device may store only some parameter values required for using the public device among all the parameters.

As described above, only the parameter values required for controlling the external device 501 may be tagged on the external device 501. According to an embodiment, an electronic device (e.g., the first electronic device 201 or the second electronic device 204) that tags shared information on the external device 501 may detect only the sensing data related to the parameters included in the shared information, thereby reducing the power consumption thereof.

According to an embodiment, an effective period may have been configured for the user information or the shared information. According to an embodiment, the state determination module 612 of the first processor 610 may configure the effective period of the user information or the effective period of the shared information.

According to an embodiment, the state determination module 612, when generating the user information or transmitting the shared information to the external device 501, may configure the effective period of the user information or the shared information together. The effective period of the user information or the shared information may be determined to be a default value, or may be determined according to a user input, and may also be changed according to a change in the user's state, which is detected by the sensor module 611. For example, it may be assumed that the user is maintained in a sleep state and then deviates from the sleep state. The state determination module 612 may limit the effective period of biometric information among the user information or the shared information to the duration for which the user is maintained in the sleep state. Further, when the user deviates from the sleep state, the state determination module 612 may request the external device 501 to destroy the biometric information.

According to an embodiment, the state determination module 612 may configure the effective period according to the priorities of the parameters that are included in the user information or the shared information.

For example, the priorities of the parameters may be divided into a high priority, a medium priority, and a low priority. The high-priority parameters, which are user information that has to be most preferentially considered, may have an effective period of more than one day, or may have no effective period. The high-priority parameters may be, for example, biometric information that represents the user's physical state. The medium priority parameters, which are user information of which the effective period may be adjusted by a user selection, may have an effective period of less than 24 hours. The low priority parameters, which have an effective period shorter than those of the high and medium priority parameters, may be, for example, feeling information of which the state frequently changes.

According to an embodiment, the state determination module 612 may configure the effective period according to the types of the parameters that are included in the user information or the shared information.

For example, biometric information for checking the user's continual physical state may have a long effective period, or the effective period may be configured, or extended, until the user's state changes. Further, biometric information (e.g., a heart rate, a blood pressure, a body temperature, etc.) that is measured in real time may have a short effective period.

According to an embodiment, the user's feeling information, such as a specific mood, which continues for a long period of time, may have an effective period longer than that of different feeling information. Furthermore, the user's feeling information related to his/her emotion that instantaneously changes may have an effective period shorter than that of the biometric information or the motion information.

According to an embodiment, the first processor 610 of the electronic device 201 may subdivide the user's feeling information to manage the same. For example, the first processor 610 may classify the user's feeling information into mood information and emotion information. The user's feeling may change according to his/her internal or external factor. The first processor 610 may manage a less sensitive feeling as mood information and a more sensitive feeling as emotion information according to the degree of reaction of the user. For example, in a case where multiple factors or events are complexly accumulated and expressed as the user's feeling, the first processor 610 may manage the information on the feeling as mood information. For example, the first processor 610 may manage information on a feeling or sense that instantaneously changes according to specific events as emotion information. The mood information may have a longer effective period than the emotion information.

According to embodiment, for the motion information, a time interval during which a specific motion is performed by the user may be set to an effective period. For example, assuming that the user is eating, the motion information related to that may be effective only while the user is eating.

According to an embodiment, the state determination module 612 may configure the effective period according to the properties of the parameters that are included in the user information or the shared information.

For example, biometric information that represents the user's current physical state or diseases (e.g., flu, etc.) among the biometric information, feeling information that represents the user's particular feeling, or motion information related to a motion (e.g., sleeping, etc.) that continues for a relatively long period of time may have a property (a long-period-property) that the effective period thereof is longer. For example, biometric information (e.g., blood pressure, etc.) that has a relatively short duration time, feeling information (e.g., surprise, etc.) that has a relatively short duration time, or motion information related to a motion (e.g., eating) that has a relatively short duration time may have a property (a short-period-property) that the effective period thereof is shorter.

According to an embodiment, the electronic device (e.g., the first or second electronic device 201 or 204) or the external device 501 may differently operate according to the effective period of the user information or the shared information.

According to an embodiment, the update period of the user information or the shared information may vary according to the parameters included in the shared information that is shared by the external device 501. For example, the update period of the user information may be changed by the electronic device according to the types of shared parameters. For example, when the effective period of the shared information that is shared with the external device 501 ends, the first electronic device 201 may update the user information and may share the updated shared information with the external device 501 again.

According to an embodiment, when the effective period of the shared information ends, the external device 501 may notify the corresponding electronic device (e.g., the first or second electronic device 201 or 204), which has transmitted the shared information, of the ending of the effective period of the shared information. According to another embodiment, when the effective period of the shared information ends, the external device 501 may notify the electronic device (e.g., the first or second electronic device 201 or 204) that currently controls the external device 501 of the ending of the effective period of the shared information. According to yet another embodiment, the external device 501 may also inform another external device of the ending of the effective period of the shared information.

According to an embodiment, when the effective period of the shared information ends, the external device 501 may delete the corresponding shared information. In a case where the shared information is deleted on account of the ending of the effective period thereof, the external device 501 may notify of the deletion of the shared information to the electronic device that has transmitted the corresponding shared information.

According to an embodiment, the time when shared information is tagged on the external device 501 may change according to the effective period of the shared information. For example, it may be assumed that a first user tries to tag first shared information on the external device 501. If there is second shared information previously tagged on the external device 501 by a second user, and the effective period of the second shared information remains, the first user may tag his/her first shared information after the end of the effective period of the second shared information, which has been tagged on the external device 501 in advance.

According to an embodiment, another user may not control the corresponding external device 501 for the effective period of shared information. For example, it may be assumed that first shared information has been tagged on the external device 501 by a first user. If a second user tries to control the external device 501 for the effective period of the first shared information, the second user has to receive approval of the first user, who has tagged the first shared information on the external device 501, in order to control the external device. According to an embodiment, in a case where another user (e.g., the second user), except the first user that has tagged the shared information, controls the external device 501 for the effective period of the shared information tagged on the external device 501, the external device 501 may notify the first user's electronic device that the second user controls the external device 501. According to an embodiment, in a case where the second user controls the external device 501 after the effective period ends, the external device 501 may not notify the first user that the second user controls the external device 501.

According to an embodiment, the type of shared information that is shared by the external device 501 may vary according to the service area where the external device 501 provides a service. The service area may be divided into a private domain and a public domain. The private domain may be, for example, a study, the main room, or a bathroom in a house, or a restroom, a private office room, or the like in a company. The public domain may be, for example, a living room, a kitchen, or a warehouse in a house, or a lounge, a conference room, an elevator, a lobby, or the like in a company.

According to an embodiment, one or more external devices 501 located in private domains may share all the parameters included in the user information, as shared information, with each other. Further, one or more external devices 501 located in public domains may share at least part of the user information, as shared information, with each other. For example, in a case where only a family exists in a public domain, the whole user information may be shared, and in a case where a friend or an outsider exists, a portion of the user information may be shared as shared information.

According to an embodiment, a tagging level or type may vary according to the authentication level of the user that controls one or more external devices 501 that are included in the service area. For example, when the user to control one or more external devices 501 included in the service area is successfully authenticated, the authenticated user may control the external devices included in the service area. Further, the authenticated user may share the shared information related to the user with the external devices included in the service area. According to an embodiment, before the authenticated user controls a desired external device 501, the user may also receive the shared information related to another user that has controlled the external device 501.

According to an embodiment, when the user is not authenticated, the unauthenticated user cannot control the external devices included in the service area because the unauthenticated user is not authorized for the control of the external devices included in the service area. Further, the unauthenticated user may not share the shared information related to the user with the external devices included in the service area, and before controlling a desired external device 501, the unauthenticated user may not receive the shared information related to another user that has controlled the external device 501.

According to an embodiment, the external device 501 may determine a user that does not carry out authentication, among the users that has accessed at least one of the externals devices included in the service area, to be a "guest", and may provide, to the guest, at least some of the services provided by the external devices included in the service area. Further, when the guest controls an authorized external device among the external devices included in the service area, the guest may share necessary shared information with the authorized external device and may receive the shared information of the previous user from the corresponding external device.

According to an embodiment, shared information that may be shared by the external device 501 may vary according to a relationship between users that control the external device 501. The relationship between the users may be, for example, a family relationship in which the users are included in an immediate family, an acquaintance relationship in which the users are included in relatives or friends other than the immediate family members, an outsider relationship in which there is no correlation between the users, or the like. For example, in a case where the relationship between the users corresponds to a family relationship, all of the user information related to the users may be shared as shared information. For example, in a case where the relationship between the users corresponds to an acquaintance relationship, some of the user information related to the users may be shared as shared information. For example, in a case where the relationship between the users corresponds to an outsider relationship, at least some of the user information related to the users may be shared as shared information, or there may be no shared information.

According to an embodiment, if a relationship between the current user and the previous user of the external device 501 corresponds to a family relationship, the shared information of the previous user, which has been stored in the external device 501, may all be shared with the current user. According to an embodiment, if the relationship between the current user and the previous user of the external device 501 corresponds to an acquaintance relationship, at least some of the shared information of the previous user, which has been stored in the external device 501, may be shared with the current user. According to an embodiment, if the relationship between the current user and the previous user of the external device 501 corresponds to an outsider relationship, at least some of the shared information of the previous user, which has been stored in the external device 501, may or may not be shared with the current user.

According to an embodiment, the shared information tagged on the external device 501 may be information that represents authority or a link for accessing the shared information stored in the external device 501, but not at least part of the user information. According to an embodiment, in a case where the user information is not stored in the external device 501 but rather in a reservoir, such as an electronic device or a cloud server, other than the external device 501, information for accessing the user information may have been shared, as shared information, with the external device 501.

According to an embodiment, in a case where the user tries to control the external device 501 using the electronic device, the user may store his/her own user information in the electronic device and may share information (e.g., at least one of the IP, Port number, and URL of the electronic device) for accessing the user information with the external device 501. Alternatively, in a case where a restriction on access to the electronic device has been configured, the electronic device may share information for accessing the electronic device with the external device 501.

According to an embodiment, the external device 501 may store an ID list of users that can access the shared information stored in the external device 501, or may restrict access by configuring the publication range of the shared information. The publication range may be shared with a user that tries to access the external device 501, or a user that tries to control the external device 501, by the external device 501.

According to an embodiment, in a case where another user, for example, a second user tries to acquire first shared information related to a first user, the external device 501 may determine whether the second user has the authority to access the first shared information. When the second user has the access authority, the external device 501 may share at least one of the IP, port number, and URL information, which indicate the reservoir in which the first shared information is stored, with the second user. The second user may access the reservoir in which the first shared information is stored. In a case where a restriction on access to the reservoir in which the first shared information is stored is configured, the second user may release the restriction on access to the reservoir using a user ID or password capable of releasing the restriction and may receive the first shared information.

Figure 11:
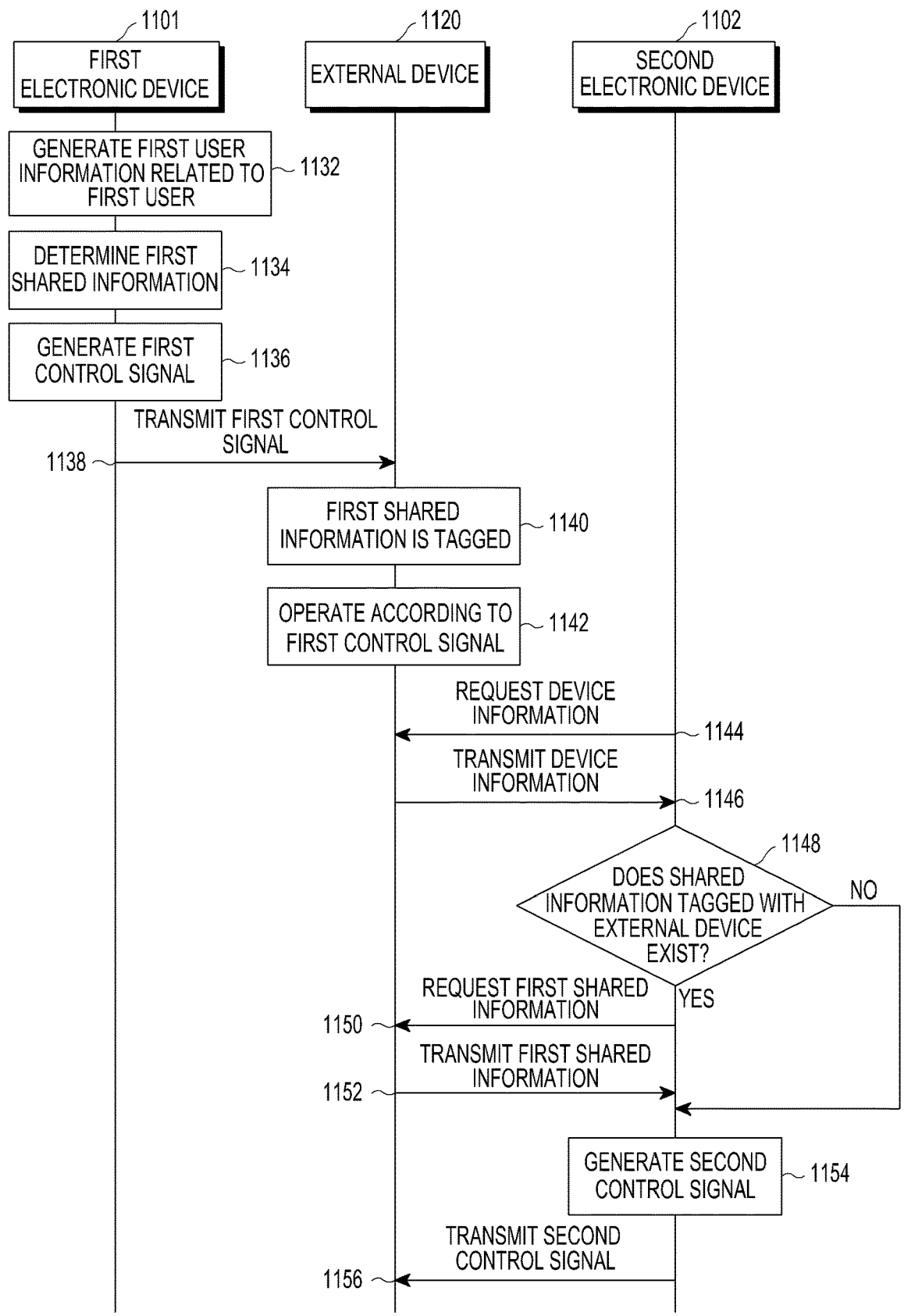
FIG. 11 is a flow diagram illustrating an example of an operation between a plurality of electronic devices and an external device, according to various embodiments of the present disclosure.

FIG. 11 is a flow diagram illustrating an example of an operation between a plurality of electronic devices and an external device, according to various embodiments of the present disclosure.

Referring to FIG. 11, a first electronic device 1101 (e.g., the first electronic device 201) may generate first user information that is user information related to a first user that uses the first electronic device 1101 (Operation 1132). According to an embodiment, the first electronic device 1101 may determine the first shared information to be shared with the external device 1120 among the first user information (Operation 1134). The first electronic device 1101 may generate a first control signal based on the first share information that has been determined in operation 1134 (Operation 1136). The first control signal may be a signal for controlling the external device 1120. The first electronic device 1101 may transmit the first shared information or the first control signal to the external device 1120 (Operation 1138).

According to an embodiment, as the first shared information is transmitted to the external device 1120, the first shared information related to the first electronic device 1101 may be tagged on the external device 1120. Further, the external device 1120 may operate according to the first control signal (Operation 1142). While the external device 1120 operates under the control of the first electronic device 1101 as described above, a second electronic device 1102 may try to control the external device 1120. The second electronic device 1102 may request device information from the external device 1120 (Operation 1144). When the external device 1120 transmits the device information to the second electronic device 1102 (Operation 1146), the second electronic device 1102 may determine whether there is information tagged on the external device 1120 (Operation 1148).

According to an embodiment, if there is information tagged on the external device 1120 (Operation 1148: Yes), namely, if the external device 1120 has already operated under the control of another electronic device (e.g., the first electronic device 1101), the second electronic device 1102 may request the information tagged on the external device 1120, for example, the first shared information related to the first electronic device 1101 from the external device 1120 (Operation 1150). When the tagged information, for example, the first shared information is transmitted from the external device 1120 (Operation 1152), the second electronic device 1102 may generate a second control signal based on the first shared information and the second user information that is user information related to a second user that uses the second electronic device 1102 (Operation 1154). The second electronic device 1102 may transmit the second control signal to the external device 1120 (Operation 1156). According to an embodiment, a processor (e.g., the second processor 620) of the external device 1120 may determine whether to apply the second control signal to the external device 1120, and may apply the first control signal, the second control signal, or a combination of the first and second control signals to the external device 1120 according to the determination result.

According to an embodiment, if information tagged on the external device 1120, for example, the first shared information does not exist (Operation 1148: No), namely, if the external device 1120 does not operate under the control of another electronic device (e.g., the first electronic device 1101), the second electronic device 1102 may generate a second control signal based on the shared information among the second user information that is user information related to the user that uses the second electronic device 1102 (Operation 1154). The second electronic device 1102 may transmit the second control signal to the external device 1120 (Operation 1156). According to an embodiment, the processor (e.g., the second processor 620) of the external device 1120 may determine whether to apply the second control signal to the external device 1120, and may apply the second control signal to the external device 1120 according to the determination result.

For example, it may be assumed that the shared information (the first shared information) related to the first user that uses the first electronic device 1101 is tagged on the external device 1120 and the external device 1120 operates according to a control signal (the first control signal) received from the first electronic device 1101. The external device 1120 may receive a request for controlling the external device 501 from the second electronic device 1102. The second electronic device 1102 may identify whether there is shared information tagged on the external device 1120.

In a case where there is no shared information tagged on the external device 1120, the second electronic device 1102 may tag the shared information (the second shared information) related to the second user, which uses the second electronic device 1102, with the external device 1120. Further, the second electronic device 1102 may generate a control signal (the second control signal) for controlling the operation of the external device 1120 and may transmit the generated control signal to the external device 1120.

In a case where there is shared information tagged on the external device 1120, for example, in a case where the first shared information has been tagged on the external device 1120, the second electronic device 1102 may receive the information tagged on the external device 1120, for example, the first shared information from the external device 1120. According to an embodiment, the second electronic device 1102 may compare the second shared information (or user information) and the first shared information. The second electronic device 1102 may determine the operation of the external device 1120 based on the priorities of the first and second users or the priorities or effective periods of the first and second shared information. The second electronic device 1102 may generate a second control signal that corresponds to the determined operation of the external device 1120 and may transmit the second control signal to the external device 1120, thereby controlling the external device 1120.

According to an embodiment, whenever a new electronic device (e.g., the first or second electronic device 1101 or 1102) enters an area where the external device 1120 provides a service, the electronic device may tag shared information related to the corresponding user with the external device 1120 and may receive the shared information that has been tagged on the external device 1120. The electronic device may determine the operation of the external device 1120 based on the shared information (or user information) that has been stored in the electronic device in advance and the shared information that has been tagged on the external device 1120, and may generate a control signal for executing the operation.

According to another embodiment, whenever the shared information of an electronic device is tagged on the external device 1120, for example, whenever a new electronic device (e.g., the first or second electronic device 1101 or 1102) enters an area where the external device 1120 provides a service, and the shared information related to the electronic device is tagged on the external device 1120, the external device 1120 may compare the shared information that has been previously tagged on the external device 1120 with the newly tagged shared information. Further, the external device 1120 may determine and execute the operation of the external device 1120 based on the comparison result.

FIGS. 12A and 12B are views illustrating an example of an electronic device that controls one or more external devices, according to various embodiments of the present disclosure.

FIGS. 12A and 12B illustrate screens 1221 and 1222 displayed through the display (e.g., the display 260 of the first electronic device 201) of the electronic device 1201 that controls the plurality of external devices. As illustrated in FIGS. 12A and 12B, the electronic device 1201 may display, through the display thereof, the control states of the external devices controlled thereby. In FIGS. 12A and 12B, it is assumed that among the external devices, the first device is a device related to temperature, the second device is a device related to music, the third device is a device related to a door lock, the fourth device is a device related to a light, the fifth device is a device related to ventilation, and the sixth device is a device related to a security camera. The states of the first to sixth devices may be displayed through first to sixth icons 1211 to 1216 that are included in the first and second screens 1221 and 1222.

Referring to FIG. 12A, the first device operates in order to maintain the room temperature at 26 degrees Celsius, the second device is reproducing a music file, the third device has released the door lock, the fourth device turns on the light from 10:00 P.M. to 6:00 A.M., the fifth device performs ventilation at every 30 minutes, and the sixth device may continually photograph an image for 24 hours. The first to sixth icons 1211 to 1216 included in the first screen 1221 of FIG. 12A may represent the operations executed by the first to sixth devices, or the states of the first to sixth devices, respectively. In the case of the first screen 1221, one user may control all the first to sixth devices, or the operations of the first to sixth devices may have been set to default values in the first electronic device 1201.

FIG. 12B illustrates the second screen 1222 that includes the first to sixth icons 1211 to 1216 in a case where a specific user enters a user input into the electronic device 1201 in order to control a specific external device. Referring to FIG. 12B, the second screen 1222 may also include the first to sixth icons 1211 to 1216. The display of the electronic device 1201 (e.g., the display 260 of the first electronic device 201) may differently display the icons 1211 to 1216 corresponding to the external devices according to tag information tagged on the external devices (e.g., shared information received from one or more electronic devices).

In FIG. 12B, the first icon 1211 may indicate that the tag "Jung" for representing a user's poor health has been tagged on the first device. Namely, the user corresponding to the tag "Jung" among a plurality of users that use the electronic device 1201 is in poor health, and the first device may perform cooling or heating in order to maintain the room temperature at 26 degrees Celsius or more in consideration of the user Jung's poor health. Further, the electronic device 1201 may display the user Jung's poor health through the display thereof (e.g., the display 260 of the first electronic device 201) by displaying the first icon 1211 with a thick boundary and displaying the user's tag "Jung" 1231 on the first icon 1211.

In FIG. 12B, the second icon 1212 may indicate that the tag "Birthday" for representing a specific user's birthday has been tagged on the second device. Namely, the specific user among the plurality of users that use the electronic device 1201 has a birthday so that the second device may reproduce music in consideration of the specific user's birthday. Further, the electronic device 1201 may display the reproduction of the music for the specific user through the display thereof (e.g., the display 260 of the first electronic device 201), by displaying the second icon 1212 with a thick boundary and displaying the user's tag "Birthday" 1232 on the second icon 1212.

In FIG. 12B, the boundary of the fourth icon 1214 becomes thicker. Accordingly, the electronic device 1201 may represent that there is no information tagged on the corresponding fourth device. Furthermore, in FIG. 12B, the boundary of the fifth icon 1216 becomes thicker. Accordingly, the electronic device 1201 may display that a user has a "bad" feeling.

According to an embodiment, the electronic device 1201 may change the colors of the icons that correspond to the external devices, respectively, in order to represent users' tagged user state information, namely, shared information. The shared information may include color information, and may further include a pattern or sign that the users may identify. By reflecting the colors, patterns, or signs in the icons 1211 to 1216, the colors of the icons may be changed, or the patterns or signs may be displayed together with the icons 1211-1216.

For example, in FIG. 12B, the electronic device 1201 may display the boundary or background of the first icon 1211 in red to display, through the display 260, that the first device corresponding to the first icon 1211 is controlled by a specific user, or that shared information related to the specific user has been tagged on the first device. For example, the display 260 may display the boundaries or backgrounds of the icons 1211 to 1216 in colors corresponding to the respective users in order to display the users that control the devices corresponding to the icons 1211 to 1216. For example, it is assumed that red, orange, yellow, and green correspond to users A, B, C, and D, respectively. According to the shared information tagged on the devices, the display 260 may display the boundaries or backgrounds of the icons 1211 to 1216, which correspond to the devices, in colors corresponding to the shared information. For example, assuming that information of user B has been tagged on the second device, the display 260 may display the boundary or background of the second icon 1212, which corresponds to the second device, in orange.

According to an embodiment, the display 260 of the first electronic device 201 may change the colors of the boundaries or backgrounds of the icons 1211 to 1216 in order to distinguish between the users of the electronic device (e.g., the second electronic device 204) that correspond to the shared information tagged on the devices that correspond to the respective icons 1211 to 1216. For example, the shared information tagged on the second device may have a higher priority than the shared information of the first electronic device 201, or the user that controls the second device may have higher authority than the user of the first electronic device 201. In this case, the display 260 may display the boundary or background of the second icon 1212 in red in order to represent that the second device is controlled by the user that has higher authority than the user of the first electronic device 201. In contrast, the shared information tagged on the second device may have a lower priority than the shared information of the first electronic device 201, or the user that controls the second device may have lower authority than the user of the first electronic device 201. In this case, the display 260 may display the boundary or background of the second icon 1212 in yellow in order to represent that the second device is controlled by the user that has lower authority than the user of the first electronic device 201.

According to another embodiment, the display 260 of the first electronic device 201 may change the colors of the boundaries or backgrounds of the icons 1211 to 1216 according to a relationship between the user of the electronic device (e.g., the user of the second electronic device 204) that corresponds to the shared information tagged on the devices corresponding to the respective icons 1211 to 1216 and the user of the first electronic device 201, for example, a family relationship, an acquaintance relationship, an outsider relationship, or the like. Furthermore, the user of the first electronic device 201 may specify colors that correspond to the respective users that control the devices corresponding to the icons 1211 to 1216, and the display 260 may change the colors of the boundaries or backgrounds of the icons corresponding to the devices, configured by the corresponding users, into the colors configured for the users.

FIGS. 13A and 13B are views illustrating another example of an electronic device that controls one or more external devices, according to various embodiments of the present disclosure.

FIGS. 13A and 13B illustrate screens displayed through the display (e.g., the display 260 of the first electronic device 201) of the electronic device 1301 that controls the plurality of external devices. As illustrated in FIGS. 13A and 13B, the electronic device 1201 may display, through the display thereof, the control states of the external devices controlled thereby. In FIGS. 13A and 13B, it is assumed that among the external devices, the first device is a device related to temperature, the second device is a device related to music, the third device is a device related to a door lock, the fourth device is a device related to a light, the fifth device is a device related to ventilation, and the sixth device is a device related to a security camera. The control states of the first to sixth devices may be displayed through first to sixth icons 1311 to 1316 that are displayed through the display.

FIGS. 13A and 13B illustrate an example in which, among a plurality of users that use the electronic device 1301, user Jung is in poor health, and the first device performs cooling or heating in order to maintain the room temperature at 26 degrees Celsius or more in consideration of the user Jung's poor health. In FIG. 13A, the first icon 1311 may be an example for representing that the user Jung has tagged information that represents his/her current physical state. The user Jung may transmit information for notifying of his/her poor health to the first device using the electronic device. After the first device receives the information for notifying of the user Jung's poor health, the first device may perform cooling or heating suitable for the user Jung's physical state and may display a tag 1331, which represents that the first device is controlled by the user Jung, in a position close to the first icon 1311. In this case, the temperature of the first device may be set, for example, by the user Jung. Further, the electronic device 1301 may display the first icon 1311 with a thick boundary in order to distinguish between the first icon 1311 and the other icons 1312 to 1316.

FIG. 13A illustrates a case in which another user enters a user input 1350 to control the operation of the first device while the room temperature has been set to 26 degrees Celsius by the user Jung. Since the first device has already been controlled, for example, by the user Jung in FIG. 13A, the electronic device 1301 may display, for example, a pop-up window 1352 as illustrated in FIG. 13B when the user input 1350 is entered. Further, the electronic device 1301 may, for example, inform the other user of the tag information tagged on the first device (e.g., information that the user Jung has a cold) and may request reconfirmation as to whether to change the operation of the first device controlled by the user Jung.

Figures 14A, 14B:
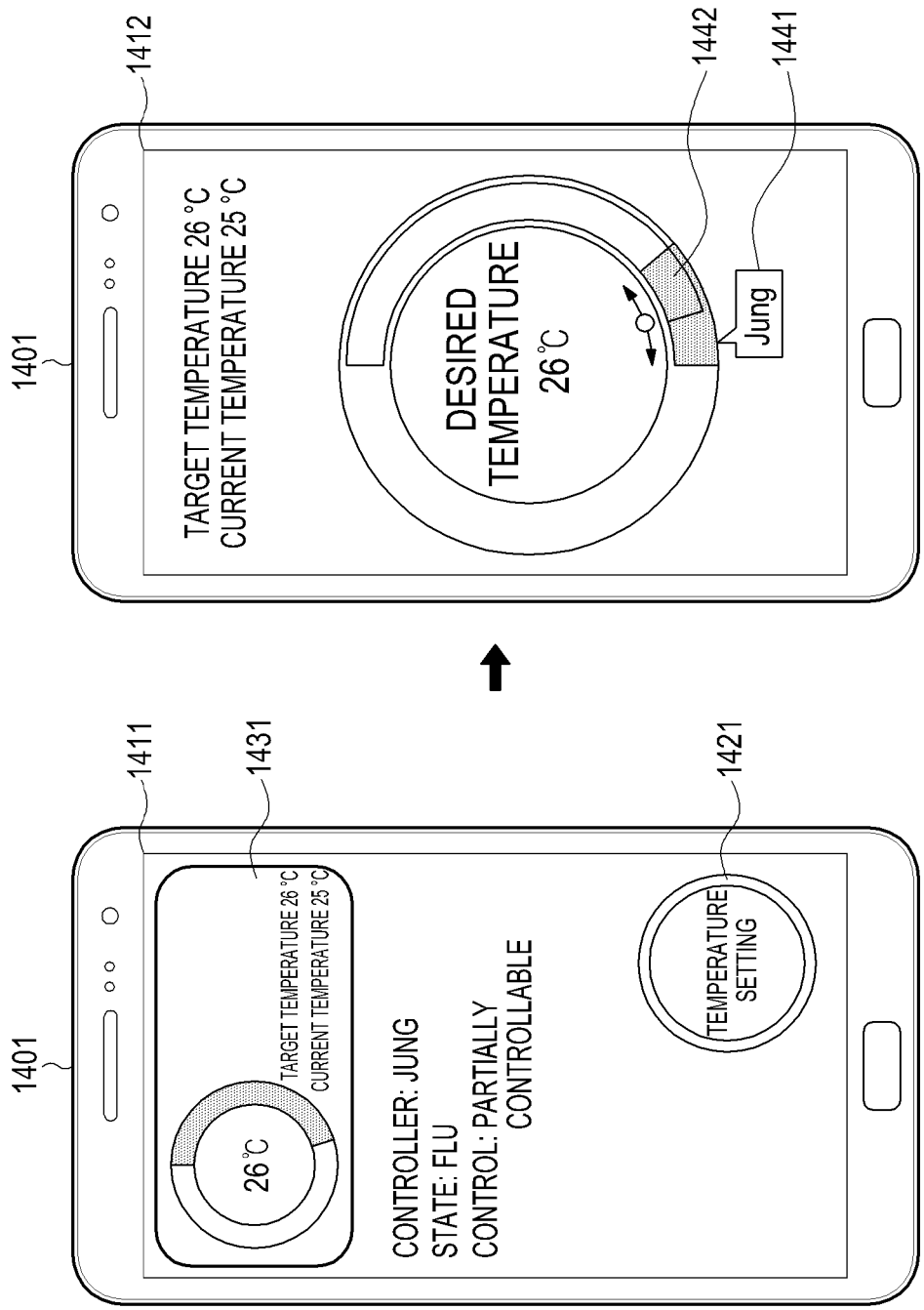
FIGS. 14A and 14B are views illustrating yet another example of an electronic device that controls one or more external devices, according to various embodiments of the present disclosure.

FIGS. 14A and 14B are views illustrating yet another example of an electronic device that controls one or more external devices, according to various embodiments of the present disclosure.

FIG. 14A illustrates a first screen 1411 in a case where the electronic device 1401 has selected an external device to be controlled, and FIG. 14B illustrates a second screen 1412 on which the electronic device 1401 displays the current state of the external device to be controlled.

Referring to FIG. 14A, the electronic device 1401 has selected an external device (hereinafter, referred to as the first external device) that can control the room temperature, such as an air-conditioner, a heater, etc. The current state of the first external device may be displayed on the first screen 1411 of the electronic device 1401. State data 1431 for representing the current state of the first external device may be included in the screen 1411. The state data may include the target temperature (26° C.) and the current temperature (25° C.) of the first external device. Furthermore, the name of the electronic device user (Controller: Jung) that has controlled the first external device, the current state of the user Jung that has controlled the first external device, whether the control of the first external device is possible (Control: partially controllable), a menu icon 1421 for the control of the first external device, and the like may be displayed on the first screen 1411. A user of the electronic device 1401 may determine whether to control the first external device based on the first screen 1411.

When a user input for selecting the menu icon 1421 is entered in FIG. 14A, the second screen 1412 illustrated in FIG. 14B may be displayed through the display (e.g., the display 260 of the first electronic device 201). Referring to FIG. 14B, the second screen 1412 is a screen provided for the control of the first external device, and the user of the electronic device 1401 may control the first external device through the second screen 1412. The second screen 1412 may include a tag 1441 of the user Jung that has controlled the first external device. By virtue of the display of the tag 1441, the user of the electronic device 1401 may identify the user that has controlled the first external device and the operation specified to the first external device by the user. In FIG. 14B, it can be seen that the user Jung that has controlled the first external device has maintained the room temperature at 26° C. The user of the electronic device 1401 may additionally regulate the operation of the first external device, for example the target temperature, with reference to the second screen 1412 illustrated in FIG. 14B.

Figure 15:
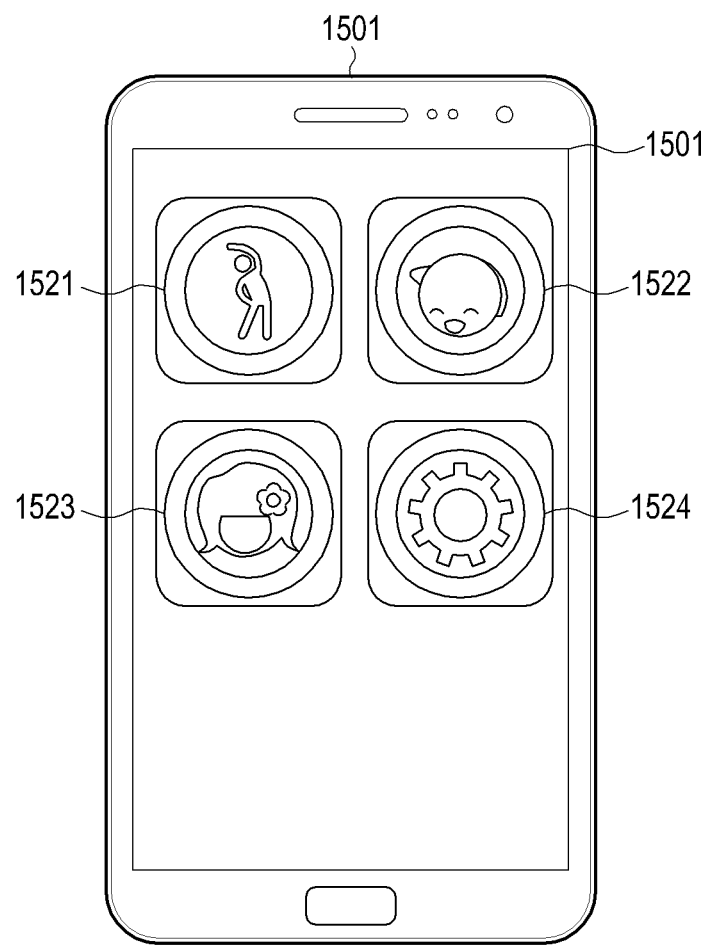
FIG. 15 is a view illustrating yet another example of an electronic device that controls one or more external devices, according to various embodiments of the present disclosure.

FIG. 15 is a view illustrating yet another example of an electronic device that controls one or more external devices, according to various embodiments of the present disclosure.

According to an embodiment, a user may determine a theme for controlling one or more external devices through the electronic device 1501 and may determine a method for controlling the external devices by selecting an item corresponding to the theme. FIG. 15 illustrates a screen 1511 that includes icons 1521 to 1524 that correspond to themes, respectively.

It may be assumed that the first icon 1521 corresponds to the first theme, the second icon 1522 corresponds to the second theme, the third icon 1523 corresponds to the third theme, and the fourth icon 1524 corresponds to the fourth theme. The first theme is an exercise mode for forming an environment suitable for the exercise of the user of the electronic device 1501, the second theme is a kids mode for protecting children from a harmful environment, the third theme is a beauty mode for maintaining an environment optimized for the user's skin state, and the fourth theme is a custom mode. The custom mode may be an operating mode that has been set in advance by the electronic device 1501.

The user may select one of the icons 1521 to 1524 included in the screen 1511 to select a desired theme and may enter an input into the electronic device 1501. When one icon is selected, the electronic device 1501 may execute an operation appropriate for the theme that corresponds to the selected icon. For example, in FIG. 15, it is assumed that the third icon 1523 has been selected by the user. Since the third icon 1523 has been selected, the third theme may be selected by the user. The electronic device 1501 may preferentially determine one or more external devices to which the third theme is to be applied and may recognize the current states of the external devices to which the third theme is to be applied. Further, the electronic device 1501 may generate control signals for controlling the external devices and may transmit the control signals to the corresponding external devices.

According to an embodiment, the control signals generated by the electronic device 1501 may not be applied, or only some of them may be applied, according to the current states of the respective external devices to which the theme selected by the user is to be applied. For example, in a case where the priority of the electronic device that has previously controlled the corresponding external device is higher than that of the electronic device 1501, the control signals generated by the electronic device 1501 may be ignored by the corresponding external device.

Figures 16A, 16B:
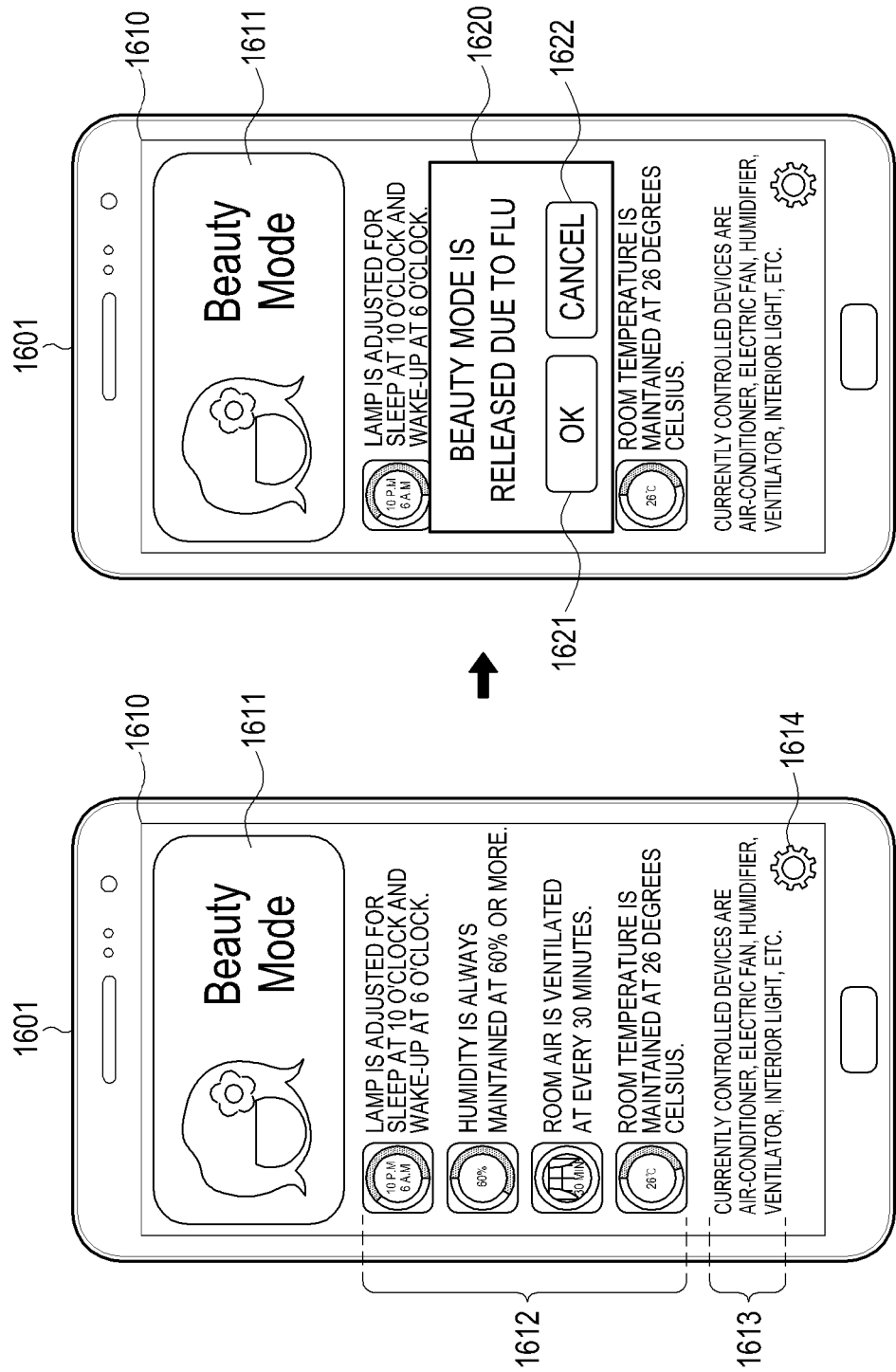
FIGS. 16A and 16B are views illustrating yet another example of an electronic device that controls one or more external devices, according to various embodiments of the present disclosure.

FIGS. 16A and 16B are views illustrating yet another example of an electronic device that controls one or more external devices, according to various embodiments of the present disclosure.

FIG. 16A illustrates a first screen 1610 in a case where a user of the electronic device 1601 selects, for example, a beauty mode, and FIG. 16B illustrates a second screen 1612 for releasing the theme of FIG. 16A.

Referring to FIG. 16A, the electronic device 1601 may display a screen for notifying of the theme on which external devices are being executed, for example, the first screen 1610 for notifying that the beauty mode is being executed. The electronic device 1601 may display, through the first screen 1610, an item 1611 for representing the currently running theme, the current state 1612 according to the currently running theme, and the types of external devices (1613) controlled according to the currently running theme. Further, the electronic device 1601 may display, on the first screen 1610, a setting change icon 1614 for changing the currently running theme or the operations of the currently operating external devices.

When receiving a user input for ending the currently running theme, for example, when receiving a user input for releasing the beauty mode as illustrated in FIG. 16B, the electronic device 1601 may display a pop-up window 1620 in order to receive, from the user, confirmation as to whether to release the currently running theme (operating mode). The user that uses the electronic device 1601 may select one of "Confirm" 1621 and "Cancel" 1622 to finally determine whether to release the corresponding operating mode.

According to an embodiment, an external device 501 may experience a conflict, such as a conflict between control signals received from two or more electronic devices (e.g., the first and second electronic devices 201 and 204) in the process in which the external device 501 is controlled. In this case, the external device 501 may determine the physical or emotional states of the users that use the electronic devices according to the shared information tagged on the external device 501, and may determine and execute the operation of the external device 501 according to the determination result.

For example, the second processor 620 of the external device 501 may determine the operation of the external device 501 according to the priorities of the users of the electronic devices, for example, a relationship between the users of the electronic devices, such as priorities according to their ages, priorities in a family relationship, priorities in an office, etc.

According to an embodiment, it may be assumed that the external device 501 has been controlled by the first user of the first electronic device 201. Thereafter, the external device 501 may be controlled by the second user of the second electronic device 204. The second electronic device 204 may infer the previous user's control purpose through the shared information (e.g., health information or feeling information) tagged on the external device 501 by the previous user, namely, the first user. The second electronic device 204 may compare the health information or feeling information of the first user, which is the previous user, and the user information of the second user. The second electronic device 204 may determine the operation of the external device 501 according to the comparison result. For example, the first user's current state may preferentially require the control of the external device 501 rather than the second user's current state. The second electronic device 204 may not control the external device 501, or may control the external device 501 to perform an operation by assigning a weighting value to the first user rather than the second user. In contrast, the second user's current state may preferentially require the control of the external device 501 rather than the first user's current state. The second electronic device 204 may control the external device 501 to perform operation by assigning a weighting value to the second user rather than the first user.

For example, the first user had a bad cold so home appliances, including a cooling/heating device, may have been set to relieve the first user's cold symptom. If the second user does an exercise, comes back home while sweating, and then controls the cooling/heating device in order to dry the sweat off, a conflict may be generated between the first and second users in the control of the home device. Therefore, according to the user input of the second user, the electronic device of the first or second user or the external device 501 controlled by the first or second user may determine that the relief of the cold symptoms of the first user is more important than the current state of the second user. Accordingly, the second user's electronic device may not perform control in order to dry the second user's sweat off, or may decrease the weighting value for the second user's control authority.

According to an embodiment, health information or feeling information related to a user of an electronic device (e.g., the first electronic device 201) may conflict with each other in the process in which the external device 501 is controlled. According to an embodiment, shared information is tagged on each external device so that the shared health or feeling information of the user may be used to prevent a conflict between the external devices. For example, in a case where a first user experiences psychological anxiety, the external devices 501, for example home network devices, may operate in a security mode according to the feeling information that represents the first user's psychological anxiety. According to the security mode, the home network devices operate to lock all the windows and doors of the house, thereby forming a home environment for relieving the user's anxiety. Furthermore, the home network devices may store the feeling information that represents the first user's anxiety. Moreover, in a case where the windows are maintained in the closed state due to the continuation of the psychological anxiety, the house is not ventilated so that a second user may feel heat. The sensor module (e.g., the sensor module 611 of the first electronic device 201) of the electronic device may generate health information for representing that the second user is sweating. According to the health information, the electronic device may command the home network devices to open the windows or doors. The home network devices may receive the health information and may operate to update the shared information related to the second user and to open the windows or doors.

A window opening/closing device and a door opening/closing device that have received the command from the electronic device may store the first user's feeling information (psychological anxiety) and may share the second user's health information (sweating) with the electronic devices used by the first and second users. Since the first user's anxiety continues, the window opening/closing device and the door opening/closing device may open the windows and doors within such a range as not to degrade the security, or may restrict the information on the opening such that the degree to which the windows or doors are opened is within such a range as to maintain the security. According to another embodiment, the electronic device may also control the home network devices to operate a cooling device, instead of opening the windows or doors in order to solve the sweating phenomenon.

FIGS. 17A and 17B are views illustrating yet another example of an electronic device that controls one or more external devices, according to various embodiments of the present disclosure.

FIG. 17A illustrates a first screen 1710 that includes icons 1711 to 1716 corresponding to the respective external devices that can be controlled by the electronic device 1710. The electronic device 1701, after recognizing the external devices that can be controlled by the electronic device 1701, may display the first screen 1710, which includes the icons 1711 to 1716 that represent the states of the corresponding external devices, to a user through the display thereof (e.g., the display 260 of the first electronic device 201).

FIG. 17B illustrates a screen on which the electronic device 1701 displays the current state of an external device that corresponds to an icon selected by a user, or displays whether the external device can be controlled. In FIG. 17A, it is assumed that the user 1750 selects the second icon 1712 to control an external device related to music. FIG. 17B is a view in which the control state of the external device related to music is displayed in the form of a pop-up window 1720 on the screen 1710. In FIG. 17B, it is assumed that the user reproduced music using the external device related to music after ten o'clock. The pop-up window 1720 is provided in order to inform the user 1750 that the reproduction of music is restricted in the currently executed operating mode. The user 1750 may remove the pop-up window 1720 from the screen 1710 by entering a user input into the electronic device 1701 in order to select the okay button 1721 of the pop-up window 1720.

FIGS. 18 and 19 illustrate examples of controlling an external device according to the states of users that use a plurality of electronic devices, respectively.

FIG. 18 is a table 1810 illustrating an example of shared information on a plurality of users, which is applied to an external device (e.g., the external device 501) related to the control of the room temperature.

Referring to FIG. 18, four users have a cold, five users are exercising, and three users are sweating. Further, the users that have a cold have set the room temperature to 26° C., the users that are exercising have set the room temperature to 22° C., and the users that are sweating have set the room temperature to 24° C. The external device may adjust the room temperature with reference to the table 1810.

For example, the external device may adjust the room temperature according to the set temperature of the users that correspond to the current state in which the greatest number of users are involved. Since the number of users that are exercising is greatest in the table 1810, the external device may adjust the room temperature to 22° C. For example, the external device may adjust the room temperature to the average value of the set temperatures of the users. The external device may obtain 24° C., as the average value, from the table 1810 and may adjust the room temperature to 24° C. For example, the external device may also calculate the average value by assigning weighting values according to the parameters included in the shared information, for example, the priorities of the current states of the users. Further, the external device may also set the room temperature according to the parameters included in the shared information, for example, the priorities according to the current states of the users. For example, in a case where the "Flu" has the highest priority among the current states of the users, the external device may adjust the room temperature to 26° C.

FIG. 19 is a table 1910 illustrating an example of shared information on a plurality of users, which is applied to one or more external devices related to broadcast programs.

Referring to FIG. 19, channel 5 is a news channel, viewers are all ages, and the number of users that are viewing channel 5 is 4. Channel 7 is an entertainment channel and is preferentially recommended when a user's emotional state corresponds to depression or high-stress, viewers' age is 12 or more, and the number of users that are viewing channel 7 is 5. Channel 9 is a sports channel and is preferentially recommended when a user's emotional state corresponds to depression or high-stress, viewers are all ages, and the number of users that are viewing channel 9 is 3. Channel 11 is a movie channel, there may be a limit for channel 11 according to a blood pressure or a heart rate among a user's physical states, viewers' age is 19 or older, the number of users that are viewing channel 11 is 2, and the number of users that cannot view channel 11 is 4.

An external device (e.g., the external device 501) that outputs the broadcast program may provide the broadcast program of the corresponding channel to the electronic devices (e.g., the first electronic device 201) of the users according to the states of the users, or the characteristics of the channels, which are listed in the table 1910.

According to an embodiment, in a case where an external device (e.g., the external device 501) is not controlled according to the shared information tagged on the external device, the external device may transmit, to the user's electronic device by using the shared information, a notification for notifying that the external device is not controlled according to the user's setting.

With the activation of control of wired/wirelessly connected external devices, various external devices installed in houses, offices, vehicles, and the like can be controlled by an individual and multiple users, and a conflict may be generated between the users that try to control the external devices. In a case where a conflict is generated, each external device may operate according to the last controller's setting, or may be controlled based on the priorities of the controllers. In this case, a controller that has previously controlled the external device may not control the external device according to his/her setting. Further, an external device that has been already controlled by a different controller may not be controlled by the current controller that tries to control the external device. Accordingly, the external device may transmit a notification for notifying that the external device is not controlled according to the user's setting, to the electronic devices of all the users that have controlled the external device, except the electronic device that has transmitted the shared information or control signal that relates to the current operation of the external device. According to another embodiment, by transmitting the notification, the external device may also transmit the notification to all devices (e.g., an electronic device, another external device, etc.) close to the external device.

According to an embodiment, the notification corresponds to the reason why the external device does not operate according to the control of the user of the electronic device that receives the notification or the reason why the external device executes the current operation, and may include health information or feeling information among the shared information tagged on the external device. The corresponding display of the electronic device that receives the notification may display the health information or feeling information in order to notify the user of the electronic device that the external device does not operate according to the control of the user of the electronic device.

According to an embodiment, in a case where the operation of an external device (e.g., the external device 501) changes, the external device may transmit a notification for notifying that the operation of the external device changes to the users that have previously controlled the external device. The notification corresponds to the reason why the external device does not operate according to the control of the user of the electronic device that receives the notification or the reason why the external device executes the current operation, and may include health information or feeling information among the shared information tagged on the external device. The corresponding display of the electronic device that receives the notification may display the health information or feeling information in order to notify the user of the electronic device that the operation of the external device has changed.

According to an embodiment, the shared information that is shared by a user of an external device (e.g., the external device 501) may be used as machine learning information for controlling the external device. In a case where one external device is controlled by a plurality of users, each user may transmit shared information that includes health information or feeling information, together with a control signal, to the external device to be controlled. The external device that receives the control signal and the shared information may determine the operation of the external device using the shared information received from the users' electronic devices.

According to an embodiment, the shared information that is shared with an external device by a plurality of users may include profile information for representing each user's gender, age, or tendency. Each external device may accumulate and store the shared information and the operation according to the shared information to learn the operation according to the user's state and to operate according to the learning result.

According to an embodiment, in a case where a conflict is generated in the control setting between users, each external device may determine the setting or operation of the external device by compromising the profile information and the feeling or health information of each user at the time when the conflict is generated. Further, if the users do not request the external device to change the changed setting again, the external device may store the feeling or health information and the changed setting thereof. Further, when a similar situation is generated, the external device may consider the changed setting, obtained by compromising the feeling information or health information, as one of the settings that can be applied to the external device in the similar situation.

For example, it is assumed that external devices in a house are controlled for a child that has a cold. An operation setting applied to each external device in the situation where the child has a cold may have the highest priority. Accordingly, a control signal for controlling external devices of another family member may be ignored by the external devices. When it is determined that a child in the family has a cold, the external devices may consider the operation setting in the situation or the health information in the situation as the highest priority factor in the control of the external devices.

The term "module" used in the present disclosure may refer to, for example, a unit including one or more combinations of hardware (e.g., including processing circuitry), firmware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of a processor, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 220), may cause the one or more processors to execute the function corresponding to the instruction. The computer-readable storage medium may be, for example, the memory 230.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

In a machine readable recording medium having a program recorded therein for executing a method of controlling an external device by an electronic device, according to various embodiments, the method may include: acquiring biometric information related to a user of the electronic device; and generating user information related to the user based on the biometric information and storing the generated user information.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. A method for controlling an external device by an electronic device, the method comprising:
   obtaining, by the electronic device, sensing data related to a user among a plurality of users that use the external device from among a plurality of external devices;
   generating, by the electronic device, shared information of the user based on the sensing data;
   transmitting, by the electronic device, a request for tagging the shared information of the user to the external device; and
   displaying, by the electronic device, a plurality of icons corresponding to the plurality of external devices,
   wherein a first icon corresponding to the external device indicates that the shared information of the user is tagged on the external device, and
   wherein the first icon is represented based on who is tagged among the plurality of users.

2. The method of claim 1, wherein the shared information of the user comprises at least part of the user's physical state, the user's emotional state, or information on the user's surrounding environment.

3. The method of claim 1, further comprising:
if a user input for controlling the external device is detected, requesting, to the external device, device information related to the external device, and receiving the device information;
generating a control signal for controlling the external device based on the device information or the shared information; and
transmitting the control signal to the external device,
wherein the shared information is determined based on the device information and the preset sharing rule.

4. The method of claim 1, further comprising:
displaying one or more items, which represent a control state of the external device, close to the icon, or differently displaying the icon based on the control state of the external device.

5. An electronic device for controlling an external device comprising:
a display;
a memory;
a sensor module comprising at least one sensor, the sensor module configured to obtain sensing data related to a user among a plurality of users that use the external device from among a plurality of external devices; and
a processor configured to:
generate shared information of the user based on the sensing data,
transmit a request for tagging the shared information of the user to the external device, and
control the display to display a plurality of icons corresponding to the plurality of external devices,
wherein a first icon corresponding to the external device indicates that the shared information of the user is tagged on the external device, and
wherein the first icon is represented based on who is tagged among the plurality of users.

6. The electronic device of claim 5, wherein the shared information of the user comprises at least part of the user's physical state, the user's emotional state, or information on the user's surrounding environment.

7. The electronic device of claim 5, further comprising:
a communication interface comprising communication circuitry configured to:
request, to the external device, device information related to the external device if a user input for controlling the external device is detected, and
receive the device information from the external device.

8. The electronic device of claim 7, wherein the processor is further configured to:
control the communication interface to generate a first control signal for controlling the external device based on the device information or the shared information, and
control the communication interface to transmit the first control signal to the external device,
wherein the shared information is determined based on the device information and the preset sharing rule.

9. The electronic device of claim 5,
wherein the processor is further configured to control the display to display one or more items representing a control state of the external device, close to the icon, or to differently display the icon based on the control state of the external device.

10. A non-transitory computer readable recording medium having a program recorded thereon which, when executed causes an external device to be controlled by an electronic device by performing operations comprising:
acquiring sensing data related to a user among a plurality of users that use the external device from among a plurality of external devices;
generating shared information of the user based on the sensing data;
transmit a request for tagging the shared information of the user to the external device, and
display a plurality of icons corresponding to the plurality of external devices,
wherein a first icon corresponding to the external device indicates that the shared information of the user among the plurality of users is tagged on the external device, and
wherein the first icon is represented based on who is tagged among the plurality of users.

* * * * *